United States Patent [19]
Schena et al.

[11] Patent Number: 6,166,723
[45] Date of Patent: *Dec. 26, 2000

[54] MOUSE INTERFACE DEVICE PROVIDING FORCE FEEDBACK

[75] Inventors: Bruce M. Schena, Menlo Park; Louis B. Rosenberg, Pleasanton, both of Calif.

[73] Assignee: Immersion Corporation, San Jose, Calif.

[*] Notice: This patent is subject to a terminal disclaimer.

[21] Appl. No.: 08/965,720

[22] Filed: Nov. 7, 1997

Related U.S. Application Data

[63] Continuation-in-part of application No. 08/560,091, Nov. 17, 1995, Pat. No. 5,805,140, and a continuation-in-part of application No. 08/756,745, Nov. 26, 1996, Pat. No. 5,815,308, and a continuation-in-part of application No. 08/881,691, Jun. 24, 1997.

[51] Int. Cl.$^7$ .............................. G06F 3/033; G09G 5/08
[52] U.S. Cl. ............................ 345/184; 345/157; 345/163
[58] Field of Search ...................... 345/157, 160, 345/163, 184; 463/30, 37; 434/45; 395/99; 244/233

[56] References Cited

U.S. PATENT DOCUMENTS

| | | | |
|---|---|---|---|
| 3,919,691 | 11/1975 | Noll | 340/172.5 |
| 4,385,836 | 5/1983 | Schmitt | 356/374 |
| 4,398,889 | 8/1983 | Lam et al. | 434/45 |
| 4,477,043 | 10/1984 | Repperger | 244/223 |
| 4,546,347 | 10/1985 | Kirsch | 340/710 |
| 4,678,908 | 7/1987 | LaPlante | 250/231 SE |
| 4,680,466 | 7/1987 | Kuwahara et al. | 250/231 |
| 4,775,289 | 10/1988 | Kazerooni | 414/735 |
| 4,776,701 | 10/1988 | Pettigrew | 356/356 |
| 4,782,327 | 11/1988 | Kley et al. | 340/365 |
| 4,794,384 | 12/1988 | Jackson | 340/710 |
| 4,795,901 | 1/1989 | Kitazawa | 250/231 |
| 4,799,055 | 1/1989 | Nestler et al. | 340/710 |

(List continued on next page.)

FOREIGN PATENT DOCUMENTS

| | | |
|---|---|---|
| 0626653A2 | 11/1994 | European Pat. Off. . |
| 0875819 | 11/1998 | European Pat. Off. . |
| 4-34610 | 5/1990 | Japan . |
| WO9426167 | 11/1994 | WIPO . |
| WO9520788 | 8/1995 | WIPO . |
| WO9532459 | 11/1995 | WIPO . |
| WO9731333 | 8/1997 | WIPO . |

OTHER PUBLICATIONS

Schmult, B. et al., "Application Areas for a Force–Feedback Joystick," DSC—vol. 49, Advances in Robotics, Mechatronics, and Haptic Interfaces, ASME 1993, pp. 47–54.

Rosenberg, Louis, "A Force Feedback Programming Primer," Immersion Corp., 1997, pp. 1–177.

Iwata, H. "Artificial Reality with Force–feedback," Computer Graphics, vol. 24, No. 4, 1990, pp. 165–170.

Minsky, M. et al., "Feeling and Seeing: Issues in Force Display," ACM 089791–351–5, 1990, pp. 235–245, 270.

(List continued on next page.)

*Primary Examiner*—Jeffery Brier
*Attorney, Agent, or Firm*—James R. Riegel

[57] ABSTRACT

A force feedback mouse interface device connected to a host computer and providing realistic force feedback to a user. The mouse interface device includes a mouse object and a linkage coupled to the mouse that includes a plurality of members rotatably coupled to each other in a planar closed-loop linkage, two of the members coupled to ground and rotatable about the same axis. Two actuators, preferably electromagnetic voice coils, provide forces in the two degrees of freedom of the planar workspace of the mouse object. Each of the actuators includes a moveable coil portion integrated with one of the members of the linkage and a magnet portion coupled to the ground surface through which the coil portion moves. At least one sensor is coupled to the ground surface that detects movement of the linkage and provides a sensor signal including information from which a position of the mouse object in the planar workspace can be determined.

39 Claims, 11 Drawing Sheets

U.S. PATENT DOCUMENTS

| | | | |
|---|---|---|---|
| 4,800,721 | 1/1989 | Cemenska et al. | 60/393 |
| 4,811,608 | 3/1989 | Hilton | 73/862.04 |
| 4,823,634 | 4/1989 | Culver | 74/471 |
| 4,839,838 | 6/1989 | LaBiche et al. | 364/709.11 |
| 4,861,269 | 8/1989 | Meenen, Jr. | 434/45 |
| 4,868,549 | 9/1989 | Affinito et al. | 340/710 |
| 4,935,728 | 6/1990 | Kley | 340/709 |
| 5,006,703 | 4/1991 | Shikunami et al. | 250/231 |
| 5,044,956 | 9/1991 | Behensky | 434/45 |
| 5,065,145 | 11/1991 | Purcell | 340/706 |
| 5,068,529 | 11/1991 | Ohno et al. | 250/231 |
| 5,095,303 | 3/1992 | Clark et al. | 340/710 |
| 5,103,404 | 4/1992 | McIntosh | 318/568.22 |
| 5,107,080 | 4/1992 | Rosen | 200/6 |
| 5,107,262 | 4/1992 | Cadoz et al. | 341/22 |
| 5,142,931 | 9/1992 | Menahem | 74/471 |
| 5,146,566 | 9/1992 | Hollis, Jr. et al. | 395/275 |
| 5,185,561 | 2/1993 | Good et al. | 318/432 |
| 5,186,629 | 2/1993 | Rohen | 434/114 |
| 5,193,963 | 3/1993 | McAffee et al. | 414/5 |
| 5,220,260 | 6/1993 | Schuler | 318/561 |
| 5,223,776 | 6/1993 | Radke et al. | 318/568.1 |
| 5,228,356 | 7/1993 | Chuang | 74/471 |
| 5,229,836 | 7/1993 | Nagano | 356/373 |
| 5,254,919 | 10/1993 | Bridges et al. | 318/560 |
| 5,264,768 | 11/1993 | Gregory et al. | 318/561 |
| 5,296,846 | 3/1994 | Ledley | 345/161 |
| 5,296,871 | 3/1994 | Paley | 345/163 |
| 5,355,148 | 10/1994 | Anderson | 345/166 |
| 5,359,193 | 10/1994 | Nyui et al. | 250/237 |
| 5,374,942 | 12/1994 | Gilligan et al. | 345/157 |
| 5,379,663 | 1/1995 | Hara | 74/471 |
| 5,384,460 | 1/1995 | Tseng | 250/231 |
| 5,389,865 | 2/1995 | Jacobus et al. | 318/568.11 |
| 5,396,266 | 3/1995 | Brimhall | 345/161 |
| 5,397,323 | 3/1995 | Taylor et al. | 606/130 |
| 5,398,044 | 3/1995 | Hill | 345/145 |
| 5,405,152 | 4/1995 | Katanics et al. | 276/438 |
| 5,414,337 | 5/1995 | Schuler | 318/561 |
| 5,452,615 | 9/1995 | Hilton | 73/862 |
| 5,457,479 | 10/1995 | Cheng | 345/163 |
| 5,473,235 | 12/1995 | Lance et al. | 318/561 |
| 5,477,237 | 12/1995 | Parks | 345/156 |
| 5,491,477 | 2/1996 | Clark et al. | 341/20 |
| 5,513,100 | 4/1996 | Parker et al. | 364/167.01 |
| 5,530,455 | 6/1996 | Gillick et al. | 345/163 |
| 5,587,937 | 12/1996 | Massie et al. | 364/578 |
| 5,589,854 | 12/1996 | Tsai | 345/161 |
| 5,604,345 | 2/1997 | Matsuura | 250/237 |
| 5,623,582 | 4/1997 | Rosenberg | 395/99 |
| 5,629,594 | 5/1997 | Jacobus et al. | 318/568.11 |
| 5,642,469 | 6/1997 | Hannaford et al. | 395/99 |
| 5,643,087 | 7/1997 | Marcus et al. | 463/38 |
| 5,656,901 | 8/1997 | Kurita | 318/436 |
| 5,666,138 | 9/1997 | Culver | 345/161 |
| 5,691,898 | 11/1997 | Rosenberg et al. | 364/190 |
| 5,694,153 | 12/1997 | Aoyagi et al. | 345/161 |
| 5,709,219 | 1/1998 | Chen et al. | 128/782 |
| 5,714,978 | 2/1998 | Yamanaka et al. | 345/157 |
| 5,721,566 | 2/1998 | Rosenberg et al. | 345/161 |
| 5,724,068 | 3/1998 | Sanchez et al. | 345/161 |
| 5,731,804 | 3/1998 | Rosenberg | 345/156 |
| 5,734,373 | 3/1998 | Rosenberg et al. | 345/161 |
| 5,736,978 | 4/1998 | Hasser et al. | 345/173 |
| 5,742,278 | 4/1998 | Chen et al. | 345/156 |
| 5,754,023 | 5/1998 | Rosten et al. | 318/561 |
| 5,755,577 | 5/1998 | Gillio | 434/262 |
| 5,763,874 | 6/1998 | Luciano et al. | 250/231 |
| 5,767,839 | 6/1998 | Rosenberg | 345/161 |
| 5,769,640 | 6/1998 | Jacobus et al. | 434/262 |
| 5,771,037 | 6/1998 | Jackson | 345/157 |
| 5,781,172 | 7/1998 | Engel et al. | 345/164 |
| 5,790,108 | 8/1998 | Salcudean et al. | 345/184 |
| 5,805,140 | 9/1998 | Rosenberg et al. | 345/161 |
| 5,808,603 | 9/1998 | Chen | 345/157 |
| 5,825,308 | 10/1998 | Rosenberg | 341/20 |
| 5,828,197 | 10/1998 | Martin et al. | 318/567 |
| 5,841,133 | 11/1998 | Omi | 250/231 |
| 5,844,392 | 12/1998 | Peurach et al. | 318/568.17 |
| 5,844,673 | 12/1998 | Ivers | 356/138 |
| 5,889,670 | 3/1999 | Schuler et al. | 364/186 |
| 5,929,846 | 7/1999 | Rosenberg et al. | 345/161 |
| 5,990,869 | 11/1999 | Kubica et al. | 345/163 |

OTHER PUBLICATIONS

Hannaford, B. et al., "Force–Feedback Cursor Control," NASA Tech Brief, vol. 13, No. 11, Item #21, pp. 1–4.

Atkinson, W. et al., "Computing with Feeling," Comput. & Graphics, vol. 2, Pergamon Press, 1977, pp. 97–103.

Rosenberg, L., "Virtual Fixtures as Tools to Enhance Operator Performance in Telepresence Environments," SPIE Telemanipulator Technology, 1993, pp. 1–12.

Rosenberg, L. et al., "Perceptual Decomposition of Virtual Haptic Surfaces," Proc. IEEE Symposium on Research Frontiers in Virtual Reality, 1993, pp. 1–8.

Rosenberg, L. et al., "The use of force feedback to enhance graphical user interfaces," Stereoscopic Displays and Virtual Reality Systems III, Proc. SPIE 2653, 1986, pp. 243–248.

Rosenberg, L., "Virtual haptic overlays enhance performance in telepresence tasks," Dept. of Mech. Engineering, Stanford Univ., 1993.

Gotow, J.K. et al., "Perception of Mechanical Properties at the Man—machine Interface," IEEE CH2503–1, 1987, pp. 688–689.

Wiker, S. et al., "Development of Tactile Mice for Blind Access to Computers," Proc. of Human Factors Society, 1991, pp. 708–712.

Batter, J. et al., "Grope–1: A Computer Display to the Sense of Feel," Proc. IFIP Congress, 1971, pp. 759–763.

Russo, M., "The Design and Implementation of a Three Degree–of–Freedom Force Output Joystick," Dept. of Mech. Engineering, 1990, pp. 1–40.

Fischer, P. et al., "Specification and Design of Input Devices for Teleoperation," IEEE CH2876–1, 1990, pp. 540–545.

Herndon, J. et al.,"The State–of–the–Art Model M–2 Maintenance System, " Proc. of 1984 Nat'l Topical Meeting on Robotics and Remote Handling in Hostile Environments, American Nuclear Soc., pp. 147–154.

Hannaford, B. et al., "Performance Evaluation of a Six–Axis Generalized Force–Reflecting Teleoperator," IEEE Trans. on Systems, Man, and Cybernetics, vol. 21, No. 3, 1991, pp. 620–633.

Adachi, Y. et al., "Sensory Evaluation of Virtual Haptic Push–Buttons," Technical Research Center, Suzuki Motor Corp., 1994.

Ouh–young, M. et al., "Force Display Performs Better than Visual Display in a Simple 6–D Docking Task," Int'l Conf. on Robotics and Automation, IEEE CH2750, 1989, pp. 1462–1466.

Rosenberg, L., "The Use of Virtual Fixtures to Enhance Operator Performance in Time Delayed Teleoperation," Air Force Materiel Command, AL/CF–TR–1994–0139, 1993, pp. 1–45.

Rosenberg, L., "Perceptual Design of a Virtual Rigid Surface Contact," Air Force Materiel Command, AL/CF–TR–1995–0029, 1993, pp. 1–40.

Rosenberg, L. et al., "Commercially Viable Force Feedback Controller for Individuals with Neuromotor Disabilities," U.S. Air Force Armstrong Laboratory, AL/CF–TR–1997–0016, 1996, pp. 1–33.

Colgate, J. et al., "Implementation of Stiff Virtual Walls in Force–Reflecting Interfaces," Dept. of Mech. Engineering, Northwestern Univ., 1993, pp. 1–7.

Su, S. et al., "The Virtual Panel Architecture: A 3D Gesture Framework," IEEE 0–7803–1363–1, 1993, pp. 387–393.

Kotoku, T., "A Predictive Display with Force Feedback and its Application to Remote Manipulation System with Transmission Time Delay," Proc. of 1992 IEEE/RSI Int'l Conf. on Intelligent Robots and Systems, IEEE 0–7803–0737–2, 1992, pp. 239–246.

Yokokohji, Y. et al., "What You Can See is What You Can Feel—Development of a Visual/Haptic Interface to Virtual Environment," IEEE 0–8186–7295–1, pp. 46–54.

Brooks, Jr., F. et al., "Project Grope—Haptic Displays for Scientific Visualization," Computer Graphics, vol. 24, No. 4, 1990, pp. 177–185.

Hirota, K. et al., "Development of Surface Display," IEEE 0–7803–1363–1, 1993, pp. 256–262.

Kelley, A.J., "On the Development of a Force–Feedback Mouse and Its Integration into a Graphical User Interface," 1994 Int'l Mechanical Engineering Congress and Exhibition, 1994, pp. 1–8.

Kilpatrick, P., "The Use of a Kinesthetic Supplement in an Interactive Graphics System," Univ of N. Carolina, 1976, pp. 1–176.

Winey III, C., "Computer Simulated Visual and Tactile Feedback as an Aid to Manipulator and Vehicle Control," Mech. Engineering, MIT, 1981, pp. 1–79.

Hayward, V. et al., "Design and Multi–Objective Optimization of a Linkage for a Haptic Interface," Advances in Robot Kinematics and Computationed Geometry, Kluwer Academic Publishers, 1994, pp. 359–368.

Ramstein, C. et al., "The Pantograph: A Large Workspace Haptic Device for a Multimodal Human—Computer Interaction," Computer—Human Interaction, CHI '94, pp. 1–3.

Payette, J. et al., "Evaluation of a Force Feedback (Haptic) Computer Pointing Device in Zero Gravity," DSC. vol. 58, Proc. of the ASME Dynamics Systems and Control Division, ASME 1996, pp. 547–553.

Ramstein, C., "Combining Haptic and Braille Technologies: Design Issues and Pilot Study," ASSETS '96, ACM 0–89791–776—Jun. 1996, pp. 37–44.

Millman, P. et al., "Design of a Four Degree–of–Freedom Force–Reflecting Manipulandum with a Specified Force/Torque Workspace,"0 Proc. of 1991 IEEE Int'l Conf. on Robotics and Automation, IEEE 1991, pp. 1488–1492.

Buttolo, P. et al., "Pen_Based Force Display for Precision Manipulation in Virtual Environments," IEEE 0–8186–7084–3, 1995, pp. 217–224.

Munch, S. et al., "Intelligent Control for Haptic Displays," Eurographics '96, Blackwell Publishers, 1996, pp. C–217–226.

Tavkhelidze, D. et al., "Kinematic Analysis of Five–Link Spherical Mechanisms," Mechanism and Machine Theory, Pergamon Press, vol. 9, 1974, pp. 181–190.

Adelstein, B. et al., "Design and Implementation of a Force Reflecting Manipulandum for Control Research," NASA Ames Research Center, MIT, 1992, pp. 1–24.

Ellis, R. et al., "Design and Evaluation of a High–Performance Prototype Planar Haptic Interface," DSC—vol. 49, Advances in Robotics, Mechatronics, and Haptic Interfaces, ASME 1993, pp. 55–64.

Adelstein, B., "A High Performance Two Degree–or–Freedom Kinesthetic Interface," Mass. Inst. of Technology, 1992, pp. 108–112.

Howe, R. et al., "Task Performance with a Dextrous Teleoperated Hand System," Proc. of SPIE, vol. 1833, 1992, pp. 1–9.

Kelley, A. et al., "MagicMouse: Tactile and Kinesthetic Feedback in the Human—Computer Interface using an Electromagnetically Actuated Input/Output Device," Dept. of Elec. Engineering, Univ. of British Columbia, 1993, pp. 1–27.

Akamatsu, M. et al., "Multimodal Mouse: A Mouse–Type Device with Tactile and Force Display," Presence, vol. 3, No. 1, 1994, pp. 73–80.

MOUSE INTERFACE DEVICE PROVIDING FORCE FEEDBACK

CROSS REFERENCE TO RELATED APPLICATIONS

This application is a continuation-in-part of patent application Ser. Nos. 08/560,091, now U.S. Pat. No. 5,805,140 filed Nov. 17, 1995, on behalf of Rosenberg et al., entitled "Method and Apparatus for Providing Low Cost Force Feedback and Mechanical I/O for Computer Systems", Ser. No. 08/756,745, now U.S. Pat. No. 5,815,308 filed Nov. 26, 1996, on behalf of Rosenberg et al., entitled, "Force Feedback Interface having Isotonic and Isometric Functionality," and Ser. No. 08/881,691, filed Jun. 24, 1997, on behalf of Schena et al., entitled, "Force Feedback Mouse Interface", all assigned to the assignee of this present application, and all of which are incorporated by reference herein.

BACKGROUND OF THE INVENTION

The present invention relates generally to interface devices for allowing humans to interface with computer systems, and more particularly to mechanical computer interface devices that allow the user to provide input to computer systems and provide force feedback to the user.

Computer systems are used extensively in many different industries to implement many applications, such as word processing, data management, simulations, games, and other tasks. A computer system typically displays a visual environment to a user on a display screen or other visual output device. Users can interact with the displayed environment to perform functions on the computer, play a game, experience a simulation or "virtual reality" environment, use a computer aided design (CAD) system, browse the World Wide Web, or otherwise influence events or images depicted on the screen.

One visual environment that is particularly common is a graphical user interface (GUI). GUI's present visual images which describe various graphical metaphors of a program or operating system implemented on the computer. Common GUI's include the Windows® operating system from Microsoft Corporation and the MacOS® operating system from Apple Computer, Inc. These interfaces allows a user to graphically select and manipulate functions of the operating system and application programs by using an input interface device. The user typically moves a user-controlled graphical object, such as a cursor or pointer, across a computer screen and onto other displayed graphical objects or predefined screen regions, and then inputs a command to execute a given selection or operation. The objects or regions ("targets") can include, for example, icons, windows, pull-down menus, buttons, and scroll bars. Most GUI's are currently 2-dimensional as displayed on a computer screen; however, three dimensional (3-D) GUI's that present simulated 3-D environments on a 2-D screen can also be provided.

Other programs or environments that may provide user-controlled graphical objects such as a cursor include browsers and other programs displaying graphical "web pages" or other environments offered on the World Wide Web of the Internet, CAD programs, video games, virtual reality simulations, etc. In some graphical computer environments, the user may provide input to control a 3-D "view" of the graphical environment, i.e., the user-controlled graphical "object" can be considered the view displayed on the video screen. The user can manipulate the interface device to move the view, as if moving a camera through which the user is looking. This type of graphical manipulation is common in CAD or 3-D virtual reality applications.

The user interaction with and manipulation of the computer environment is achieved using any of a variety of types of human-computer interface devices that are connected to the computer system controlling the displayed environment. In most systems, the computer updates the environment in response to the user's manipulation of a user-manipulatable physical object ("user object") that is included in the interface device, such as a mouse, joystick, trackball, etc. The computer provides visual and audio feedback to the user utilizing the display screen and, typically, audio speakers.

Another mode of feedback recently introduced to the consumer home market is force feedback, which provide the user with sensory "haptic" (feel) information about an environment. Most of the consumer force feedback devices are joysticks which include motors to provide the forces to the joystick and to the user. Current force feedback joystick devices may allow realistic and effective forces to be transmitted to a user; however, the standard joystick device is well-suited for such uses as controlling an aircraft or other simulated vehicle in a simulation or game, firstperson perspective virtual reality applications, or other rate-control tasks and is not well suited to position control tasks such as controlling a pointer or cursor in a graphical user interface. Other types of controllers, such a mouse, trackball, stylus and tablet, "touch point" keyboard pointers, and finger pads are commonly provided for cursor position control tasks since they are adept at accurately controlling the position of a graphical object in two dimensions. Herein, "position control" refers to a direct mapping of the position of the user object with a user-controlled graphical object, such as controlling a cursor in a GUI, while "rate control" refers to an indirect or abstract mapping of user object to graphical object, such as scrolling text in a window, zooming to a larger view in a window of a GUI, or controlling velocity of a simulated vehicle.

A problem with the currently-available position control interface devices is that none of them offer realistic force feedback. A mouse is not easily provided with force feedback since the mouse must be moved in a planar workspace and is not easily connected to actuators which provide the force feedback. Controllers such as trackballs and tablets are even less well suited for force feedback than a mouse controller due to their free-floating movement. A joystick, in contrast, is typically connected to an immobile base which can include large actuators needed to provide realistic forces on the joystick. A mouse can be coupled to actuators from a side linkage, but a compact, low cost, and conveniently-positioned mechanism allowing free movement of a mouse as well as providing realistic force feedback for the mouse has not been available in the consumer market.

SUMMARY OF THE INVENTION

The present invention is directed to a mouse interface which is connected to a host computer and provides realistic force feedback to a user. The interface device includes low cost, compact components that provide a convenient mouse interface for a desktop.

More specifically, the present invention provides a mouse interface device for interfacing a user's motion with a host computer and providing force feedback to the user. The host computer preferably implements a graphical environment with which the user interacts using the mouse interface device. The mouse interface device includes a user object, preferably a mouse object, contacted and manipulated by a user and moveable in a planar workspace with respect to a ground surface. A linkage coupled to the mouse includes a plurality of members rotatably coupled to each other. In one preferred configuration, the linkage is a planar closed-loop linkage including five members, where two members are coupled to ground and rotatable about the same axis. Two actuators, preferably electromagnetic voice coil actuators, provide forces in the two degrees of freedom of the planar workspace of the mouse object. Each of the actuators includes a moveable coil portion preferably integrated with one of the members of the linkage and a magnet portion coupled to the ground surface through which the coil portion moves. One or more sensors are coupled to the ground surface that detects movement of a member of the linkage and provides a sensor signal including information from which a position of the mouse object in the planar workspace can be determined.

First and second grounded base members pivot about a single axis with respect to the ground member. Preferably, the first base member and first link member are symmetrically arranged from the second base member and second link member. The coils of the actuators are preferably integrated in the members of the linkage, for example the base members, and move through magnetic fields provided by the grounded portions. In a preferred configuration, the first and second base members are coupled to a rotation point at a mid point of the base members, where one end of each base member integrates said coil such that the coil is spaced from the rotation point of the member. The actuators are preferably spaced apart from each other, and a base portion of one of the actuators is used as a base portion of a different actuator.

The sensors can be digital encoders, where the ends of the first and second base members include an encoder arc which moves past a grounded emitter and detector. The encoder arc includes a number of equally spaced marks detected by the encoders when the member moves. The arc alternatively can include an opaque portion and a transparent strip, where the strip is skewed such that its distance from a center of rotation of the arc varies along the length of the strip.

A stop mechanism limits movement of the mouse object in four directions in the planar workspace to a desired area. The stop mechanism can include a guide opening provided in a pad surface on which the mouse object slides. The linkage can be positioned beneath the pad surface, and a portion of the linkage can protrude through the guide opening and engage the sides of the guide opening to provide the limits to the mouse movement. The mouse object can also be supported by a support separate from the linkage and provided between the mouse object and the ground surface, such as a roller coupled to the mouse object or to an associated coupling. A safety switch can be included that causes the actuators to be deactivated when the user is not contacting the mouse object. A local microprocessor, separate from the host computer system, is included in the interface device and may provide local control over sensing and outputting forces to relieve the computational burden on the host computer.

The method and apparatus of the present invention provides a force feedback mouse interface that allows a user to conveniently interface with a host computer application program. The actuators, sensors, and linkage of the device, in the embodiments described, provide a compact, simple, low-cost design that outputs realistic forces on the user and accurately tracks the user's motions in the provided workspace, and is well suited for the consumer market.

These and other advantages of the present invention will become apparent to those skilled in the art upon a reading of the following specification of the invention and a study of the several figures of the drawing.

BRIEF DESCRIPTION OF THE DRAWINGS

FIG. 3a is a perspective view of a support pad for supporting the mouse of FIG. 1a;

FIG. 3b is a perspective view of the underside of the mouse object of FIG. 1a;

DETAILED DESCRIPTION OF PREFERRED EMBODIMENTS

Figure 1:
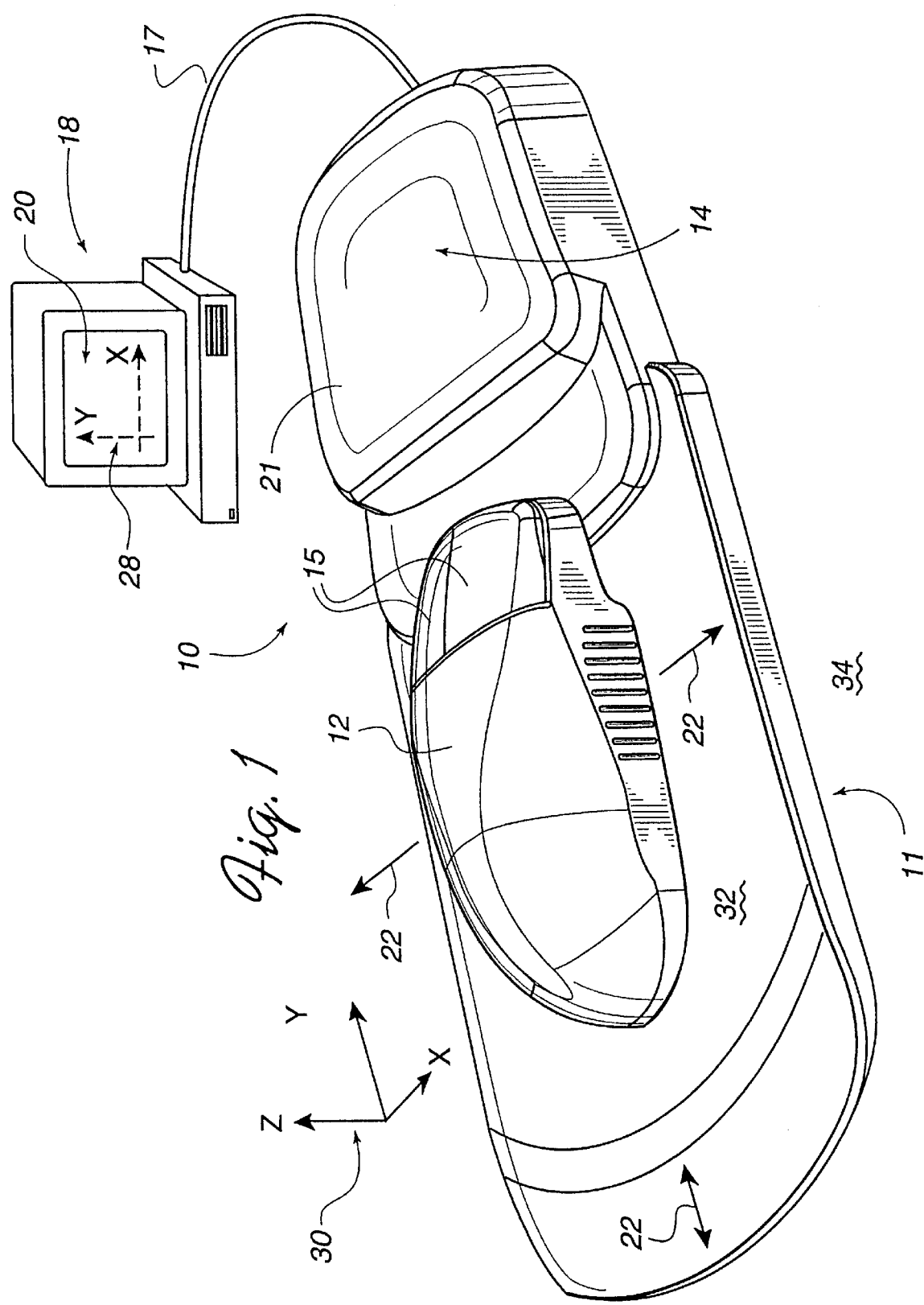
FIG. 1 is a perspective view of one embodiment of a force feedback mouse interface system of the present invention.

FIG. 1 is a perspective view of a force feedback mouse interface system 10 of the present invention capable of providing input to a host computer based on the user's manipulation of the mouse and capable of providing force feedback to the user of the mouse system based on events occurring in a program implemented by the host computer. Mouse system 10 includes an interface device 11 including a mouse or "puck" 12 and an interface 14, and a host computer 18. It should be noted that the term "mouse" as used herein, indicates an object 12 generally shaped to be grasped or contacted from above and moved within a substantially planar workspace (and additional degrees of freedom if available). Typically, a mouse is a smooth or angular shaped compact unit that snugly fits under a user's hand, fingers, and/or palm, but can be implemented as other objects as well.

Mouse 12 is an object that is preferably grasped or gripped and manipulated by a user. By "grasp," it is meant that users may releasably engage a portion of the object in some fashion, such as by hand, with their fingertips, etc. For example, images are displayed and/or modified on a display screen 20 of the computer system 18 in response to such manipulations. In the described embodiment, mouse 12 is shaped so that a user's fingers or hand may comfortably grasp the object and move it in the provided degrees of freedom in physical space. For example, a user can move mouse 12 to correspondingly move a computer generated graphical object, such as a cursor or other image, in a graphical environment provided by computer 18. The available degrees of freedom in which mouse 12 can be moved are determined from the interface 14, described below. In addition, mouse 12 preferably includes one or more buttons 15 to allow the user to provide additional commands to the computer system.

Figure 1A:
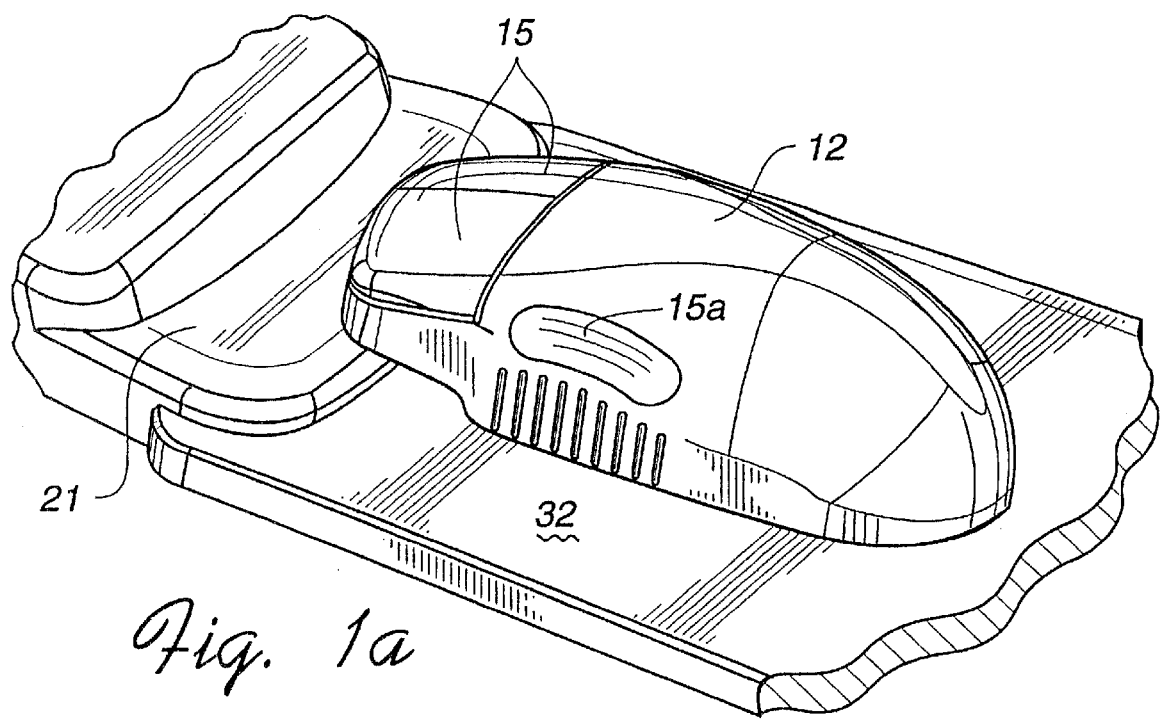
FIG. 1a is a perspective view of the mouse object to be manipulated by the user in the system of FIG. 1.

The mouse 12 may also include additional buttons. For example, FIG. 1a shows a perspective view of the opposite side of the mouse 12, in which a thumb button 15a is provided. Buttons 15 and 15a allow a user to input a command independently of the position of the mouse 12 in the provided degrees of freedom. For example, in a GUI, buttons are commonly used to select options once a cursor has been guided to a desired area or object on the screen using the position of the mouse. In one embodiment, the user can place his or her two middle fingers on buttons 15 and place the remaining fingers on the sides of mouse 12 (and at button 15a) to manipulate mouse 12 against forces generated by actuators 64. In addition, in some configurations with a smaller-size mouse 12, the fingers of a user may move the mouse 12 and press buttons 15 while the palm of the hand remains fixed or resting against a grounded surface. Since the fingers are more sensitive to output forces than the entire hand, forces of less magnitude may be output from the interface system 10 to the fingers and achieve an equivalent force sensation to higher magnitude forces applied to the entire hand (as with a joystick). Thus, less powerful actuators and less power consumption is required when the user manipulates mouse 12 with fingers alone. Thumb button 15a, in the preferred embodiment, also may command specific force feedback features of the system 10, as described below.

It will be appreciated that a great number of other types of user manipulable objects ("user objects" or "physical objects") can be used with the method and apparatus of the present invention in place of or in addition to mouse 12. For example, such objects may include a sphere, a puck, a joystick, cubical- or other-shaped hand grips, a receptacle for receiving a finger or a stylus, a flat planar surface like a plastic card having a rubberized, contoured, and/or bumpy surface, or other objects. Other examples of a user object 12 are described below with reference to FIGS 1b and 1c.

Interface 14 interfaces mechanical and electrical input and output between the mouse 12 and host computer 18 implementing the application program, such as a GUI, simulation or game environment. Interface 14 provides multiple degrees of freedom to mouse 12; in the preferred embodiment, two linear, planar degrees of freedom are provided to the mouse, as shown by arrows 22. In other embodiments, greater or fewer degrees of freedom can be provided, as well as rotary degrees of freedom. For many applications, mouse 12 need only be moved in a very small workspace area.

In a preferred embodiment, the user manipulates mouse 12 in a planar workspace, much like a traditional mouse, and the position of mouse 12 is translated into a form suitable for interpretation by position sensors of the interface 14. The sensors track the movement of the mouse 12 in planar space and provide suitable electronic signals to an electronic portion of interface 14. The interface 14 provides position information to host computer 18. In addition, host computer 18 and/or interface 14 provide force feedback signals to actuators coupled to interface 14, and the actuators generate forces on members of the mechanical portion of the interface 14 to provide forces on mouse 12 in provided or desired degrees of freedom. The user experiences the forces generated on the mouse 12 as realistic simulations of force sensations such as jolts, springs, textures, "barrier" forces, and the like.

The electronic portion of interface 14 may couple the mechanical portion of the interface to the host computer 18. The electronic portion is preferably included within the housing 21 of the interface 14 or, alternatively, the electronic portion may be included in host computer 18 or as a separate unit with its own housing. More particularly, interface 14 includes a local microprocessor distinct and separate from any microprocessors in the host computer 18 to control force feedback on mouse 12 independently of the host computer, as well as sensor and actuator interfaces that convert electrical signals to appropriate forms usable by the mechanical portion of interface 14 and host computer 18.

For example, a rigid surface is generated on computer screen 20 and a computer object (e.g., cursor) controlled by the user collides with the surface. In a preferred embodiment, high-level host commands can be used to provide the various forces associated with the rigid surface. The local control mode using a local microprocessor in interface 14 can be helpful in increasing the response time for forces applied to the user object, which is essential in creating realistic and accurate force feedback. For example, it is preferable that host computer 18 send a "spatial representation" to the local microprocessor, which is data describing the locations of some or all the graphical objects displayed in a GUI or other graphical environment which are associated with forces and the types/characteristics of these graphical objects. The microprocessor can store such a spatial representation in local memory, and thus will be able to determine interactions between the user object and graphical objects (such as the rigid surface) independently of the host computer. In addition, the microprocessor can be provided with the necessary instructions or data to check sensor readings, determine cursor and target positions, and determine output forces independently of host computer 18. The host could implement program functions (such as displaying images) when appropriate, and synchronization commands can be communicated between the microprocessor and host 18 to correlate the microprocessor and host processes. Also, the local memory can store predetermined force sensations for the microprocessor that are to be associated with particular types of graphical objects. Alternatively, the computer 18 can directly send force feedback signals to the interface 14 to generate forces on mouse 12. A suitable embodiment of the electrical portion of interface 14 is described in detail with reference to FIG. 6.

The interface 14 can be coupled to the computer 18 by a bus 17, which communicates signals between interface 14 and computer 18 and also, in the preferred embodiment, provides power to the interface 14 (e.g. when bus 17 includes a USB interface). In other embodiments, signals can be sent between interface 14 and computer 18 by wireless transmission/reception. In preferred embodiments of the present invention, the interface 14 serves as an input/output (I/O) device for the computer 18. The interface 14 can also receive inputs from other input devices or controls that are associated with mouse system 10 and can relay those inputs to computer 18. For example, commands sent by the user activating a button on mouse 12 can be relayed to computer 18 by interface 14 to implement a command or cause the computer 18 to output a command to the interface 14.

Host computer 18 is preferably a personal computer or workstation, such as an IBM-PC compatible computer or Macintosh personal computer, or a SUN or Silicon Graphics workstation. For example, the computer 18 can operate under the Windows™ or MS-DOS operating system in conformance with an IBM PC AT standard. Alternatively, host computer system 18 can be one of a variety of home video game systems commonly connected to a television set, such as systems available from Nintendo, Sega, or Sony. In other embodiments, host computer system 18 can be a "set top box" which can be used, for example, to provide interactive television functions to users, or a "network-" or "internet-computer" which allows users to interact with a local or global network using standard connections and protocols such as used for the Internet and World Wide Web. Host computer preferably includes a host microprocessor, random access memory (RAM), read only memory (ROM), input/output (I/O) circuitry, and other components of computers wellknown to those skilled in the art.

Host computer 18 preferably implements a host application program with which a user is interacting via mouse 12 and other peripherals, if appropriate, and which can include force feedback functionality. For example, the host application program can be a simulation, video game, Web page or browser that implements HTML or VRML instructions, scientific analysis program, virtual reality training program or application, or other application program that utilizes input of mouse 12 and outputs force feedback commands to the mouse 12. Herein, for simplicity, operating systems such as Windows™, MS-DOS, MacOS, Unix, etc. are also referred to as "application programs." In one preferred embodiment, an application program utilizes a graphical user interface (GUI) to present options to a user and receive input from the user. Herein, computer 18 may be referred as displaying "graphical objects" or "computer objects." These objects are not physical objects, but are logical software unit collections of data and/or procedures that may be displayed as images by computer 18 on display screen 20, as is well known to those skilled in the art. A displayed cursor or a simulated cockpit of an aircraft might be considered a graphical object. The host application program checks for input signals received from the electronics and sensors of interface 14, and outputs force values and/or commands to be converted into forces on mouse 12. Suitable software drivers which interface such simulation software with computer input/output (I/O) devices are available from Immersion Human Interface Corporation of San Jose, Calif.

Display device 20 can be included in host computer 18 and can be a standard display screen (LCD, CRT, etc.), 3-D goggles, or any other visual output device. Typically, the host application provides images to be displayed on display device 20 and/or other feedback, such as auditory signals. For example, display screen 20 can display images from a GUI. Images describing a moving, first person point of view can be displayed, as in a virtual reality game. Or, images describing a third-person perspective of objects, backgrounds, etc. can be displayed. Alternatively, images from a simulation, such as a medical simulation, can be displayed, e.g., images of tissue and a representation of a manipulated user object 12 moving through the tissue, etc.

There are two primary "control paradigms" of operation for mouse system 10: position control and rate control. Position control is the more typical control paradigm for mouse and similar controllers, and refers to a mapping of mouse 12 in which displacement of the mouse in physical space directly dictates displacement of a graphical object. The mapping can have an arbitrary scale factor or even be non-linear, but the fundamental relation between mouse displacements and graphical object displacements should be present. Under a position control mapping, the computer object does not move unless the user object is in motion. Position control is not a popular mapping for traditional computer games, but is popular for other applications such as graphical user interfaces (GUI's) or medical procedure simulations. Position control force feedback roughly corresponds to forces which would be perceived directly by the user, i.e., they are "user-centric" forces. Also, "ballistics" or other non-linear adjustments to cursor position can be used, in which, for example, small motions of the mouse have a different scaling factor for cursor movement than large motions of the mouse, to allow more control of small cursor movement. Several different ways of implementing ballistics and other control adjustments in a force feedback device are described in co-pending patent application Ser. No. 08/924,462, filed Aug. 23, 1997, and these adjustments can be used in mouse system 10 if desired.

As shown in FIG. 1, the host computer may have its own "host frame" 28 which is displayed on the display screen 20. In contrast, the mouse 12 has its own "local frame" 30 in which the mouse 12 is moved. In a position control paradigm, the position (or change in position) of a user-controlled graphical object, such as a cursor, in host frame 30 corresponds to a position (or change in position) of the mouse 12 in the local frame 28. The offset between the object in the host frame and the object in the local frame can be changed by the user for indexing, as described below.

Rate control is also used as a control paradigm. This refers to a mapping in which the displacement of the mouse 12 along one or more provided degrees of freedom is abstractly mapped to motion of a computer-simulated object under control. There is not a direct physical mapping between physical object (mouse) motion and computer object motion. Thus, most rate control paradigms are fundamentally different from position control in that the user object can be held steady at a given position but the controlled computer object is in motion at a commanded or given velocity, while the position control paradigm only allows the controlled computer object to be in motion if the user object is in motion.

The mouse interface system 10 is useful for both position control ("isotonic") tasks and rate control ("isometric") tasks. For example, as a traditional mouse, the position of mouse 12 in its local frame 30 workspace can be directly mapped to a position of a cursor in host frame 28 on display screen 20 in a position control paradigm. Alternatively, the displacement of mouse 12 in a particular direction against an opposing output force can command rate control tasks in an isometric mode. An implementation that provides both isotonic and isometric functionality for a force feedback controller and which is very suitable for the interface device of the present invention is described in patent application Ser. No. 08/756,745, now U.S. No. 5,825,308 incorporated by reference herein.

Mouse 12 is preferably supported upon a grounded pad 32 by the mechanical portion of interface 14, described below. Pad 32 or a similar surface is supported by grounded surface 34. Mouse 12 contacts grounded pad 32 (or alternatively grounded surface 34) to provide additional support for the mouse and relieve stress on the mechanical portion of interface 14. In particular, such additional support is valuable for the preferred embodiment in which there is only one location of grounding (e.g., at one grounded axis of rotation) for the mechanical linkage of the device, as in the embodiment of FIG. 2b. In such an embodiment, a roller, wheel, Teflon pad or other device is preferably used on the mouse to minimize friction between the mouse and the contacted surface, as described in greater detail below.

Mouse 12 can be used, for example, to control a computer-generated graphical object such as a cursor displayed in a graphical computer environment, such as a GUI. The user can move the mouse in 2D planar workspace to move the cursor to graphical objects in the GUI or perform other tasks. In other graphical environments, such as a virtual reality video game, a user can be controlling a computer player or vehicle in the virtual environment by manipulating the mouse 12. The computer system tracks the position of the mouse with sensors as the user moves it. The computer system may also provide force feedback commands to the mouse, for example, when the user moves the graphical object against a generated surface such as an edge of a window, a virtual wall, etc. It thus appears and feels to the user that the mouse and the graphical object are contacting real surfaces.

The mouse system 10 also preferably includes an indexing function or "indexing mode" which allows the user to redefine the offset between the positions of the mouse 12 in the local frame and a user-controlled graphical object, such as a cursor, in the host frame displayed by host computer 18. Indexing is inherently provided with a traditional position control device such as a standard mouse. When a physical limit to the mouse's movement is reached, the user typically lifts the mouse from the contacted surface and places the mouse in a different position to allow more room to move the mouse. While the mouse is off the contacted surface, no input is provided to control the cursor. Mouse 12 of the present invention also has a limit to movement in the provided planar workspace provided by a guide opening 76, as detailed below. To allow movement of the cursor in the host frame past the limits of the mouse local frame, "indexing" is implemented.

In one implementation, the user may reposition the mouse 12 without moving the controlled graphical object or providing any other input to the host computer, thus allowing the user to redefine the offset between the object's position and the cursor's position. This is analogous to standard mouse indexing. In the present invention, such indexing is achieved through an input device such as button 15a, or alternatively using switches, pressure sensors, optical sensors, contact sensors, voice recognition hardware, or other input devices. As long as the indexing button or device is activated, the mouse 12 is in indexing mode and can be moved without providing any input to the host computer (e.g., without moving the controlled graphical object). When the button is released (or indexing mode otherwise exited), the position of the cursor is again controlled by the position of the mouse 12. Alternatively, the user might toggle indexing mode and non-indexing mode with one press of a button 15 or other input device. Indexing mode can be performed directly by the host computer 18, or a local microprocessor can perform the indexing function. For example, the local processor can determine when indexing mode is active, and simply not report the position of the mouse 12 to the host computer 18 while such mode is active.

A hand weight switch can also be provided which inherently causes indexing when the user removes hand or finger weight from mouse 12. In one embodiment, the functionality of a safety switch and the indexing mode are integrated into one input device, since it is typically desirable to deactivate any output forces to the mouse 12 when indexing is being performed for safety reasons or ergonomic reasons, e.g. forces intuitively should not be output when indexing occurs. Thus, a hand weight safety switch can be used as both a safety switch and an indexing switch. This type of indexing and hand weight safety switch are described in greater detail in parent patent applications Ser. No. 08/756, 745 and Ser. No. 08/881,691.

A different way to allow indexing is to provide a combined position control and rate control device which allows different forms of control of the cursor depending on the position of the mouse in its workspace. If the mouse is positioned in an interior area of its workspace, the cursor is updated on the screen in a standard position control fashion. However, if the mouse is moved to an edge region near the limits to the workspace, a rate control paradigm is adopted. Preferably, a force is output on the mouse at the edge region border to resist motion toward the workspace limit, and the cursor is moved on the screen in a direction and rate corresponding to the mouse direction and distance of penetration against the force The user can thus control the cursor to the edge of the screen based on mouse penetration into the rate control edge region ("pressure indexing"). This embodiment is described in greater detail in co-pending patent application Ser. No. 08/924,462, by Rosenberg et al., filed Aug. 23, 1997 (Atty Docket No. IMM1P032), which is hereby incorporated by reference herein.

Other features of the present invention are also provided using force feedback functionality. For example, thumb button 15a can toggle a force functionality mode in which designated graphical objects or regions displayed on screen 20 have other functions enabled by force feedback. A graphical object, such as a window or icon in a GUI, can act differently for selection of functions of the host computer or program, and/or for the forces associated with the object/ region, depending on whether the force functionality mode is active. For example, when the mode is not active, the cursor can be moved normally through the border or edge of a window, with no force sensations associated with the movement over the window. However, when the force mode is active (such as by pressing or holding button 15a), a spring force will be output on mouse 12 opposing the movment of the cursor through the window border. This force is used as for "pressure scrolling" or as a "scroll surface", where the amount of penetration of the mouse against the spring force controls the speed of scrolling of a document displayed in that window. Alternatively, when the button 15a is held down by the user, an "isometric" or "pressure" mode can be entered at the current location of the cursor, where the mouse functions as an isometric controller. Such embodiments are described in patent application Ser. No. 08/756,745. In a "pressure clicking" or "click surface" embodiment, if the cursor is moved against the border of an icon and the force functionality mode is active, a force will be output resisting motion of the cursor into the icon; when the mouse moves against the force to a threshold distance, the icon is selected as if the cursor had clicked or double-clicked on the icon. Such an embodiment is described in co-pending patent application Ser. No. 08/879,296, entitled "Graphical Click Surfaces for Force Feedback Applications", by Rosenberg et al., filed Jun. 18, 1997, incorporated by reference herein. In other embodiments, other input devices besides or in addition to button 15a can control the force functionality mode. Or, different input devices can control different modes; for example, one button can activate the pressure scrolling mode, while a different button can activate pressure clicking mode.

Figure 1B:
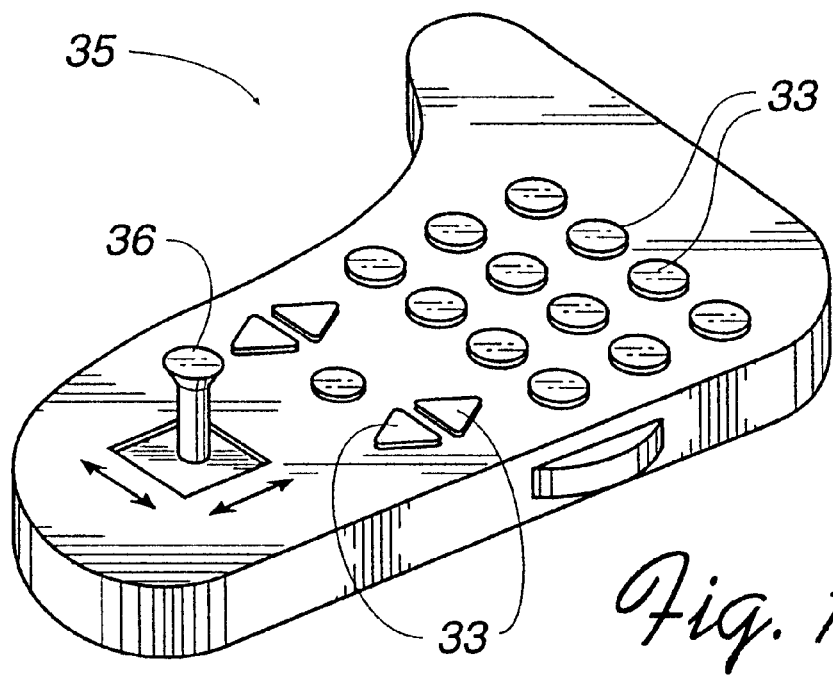
FIGS 1b and 1c are perspective views of alternate embodiments of a force feedback interface device of the present invention.
Figure 1C:
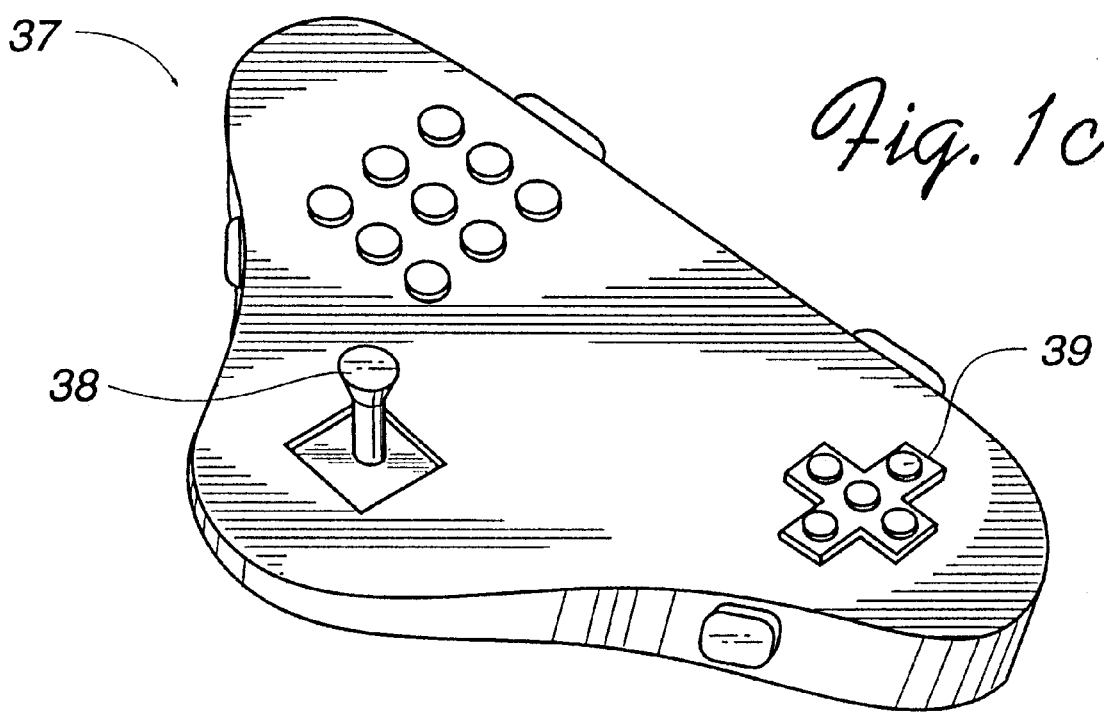

FIGS. 1b and 1c illustrate other embodiments of an interface device and user object 12 which can incorporate the features of the present invention. In FIG. 1b, a hand-held remote control device 35 can be used to access the functions of a device or appliance remotely by a user. For example, remote control 35 can be used to select functions of a television, video cassette recorder, sound stereo, etc. More specifically, remote control 35 can select functions of an internet or network computer connected to a television. For example, one popular device is Web-TV™, which is connected to a television and displays internet information such as web pages on the television screen. Remote control 35 may include buttons 33 for selecting options of the Web-TV device, of the application program running on the device, or of web pages.

Remote control 35 also includes a fingertip joystick 35 for moving a cursor on the television screen, scrolling windows, and other functions that are typically performed by a mouse on a personal computer. Fingertip joystick 35 can be implemented as the user object 12 of the interface device 11 of the present invention. For example, a linkage, actuators, and sensors similar to these components of FIGS. 1 and 2a–2b can be positioned in the housing of remote control so that joystick 35 is coupled to the linkage, e.g. at bearing 58. The joystick 35 may be moved in two planar degrees of freedom by the user's fingertips or hand. The workspace of the joystick 35 can be, for example, one-quarter to half the area of the required workspace of mouse 12. This allows the actuators, sensors, and linkage to be smaller and less costly than the embodiment of FIG. 1, e.g., forces of less magnitude, but with high fidelity, can be provided in a smaller workspace (also, since fingertips are used, output forces need not be as high a magnitude as in other embodiments). In addition, spring forces can be always provided by the actuators of the device 11 to bias the stick 35 toward the center of the planar workspace to simulate a spring return on the joystick. This simulates a pivoting fintertip joystick of the prior art that has physical springs to center the joystick. Alternatively, a conventional full-size joystick can include the centering spring forces. Also, mouse 12 in the embodiment of FIG. 1 can be provided with such a centering spring bias, e.g. when the mouse is used like a joystick in game or simulation applications.

FIG. 1c illustrates an alternate embodiment of the remote control 35 of FIG. 1b, in which a gamepad controller 37 is provided with a fingertip joystick 38. Controller 37 is intended to be held by both hands of a user. The controller 37 includes the standard input devices of prior art controllers, such as buttons and a directional game pad 39. The joystick 38 can be moved in a planar workspace with a user's thumb and can be similar to the joystick 35 of FIG. 1b to allow force feedback in games and other applications.

Figure 2A:
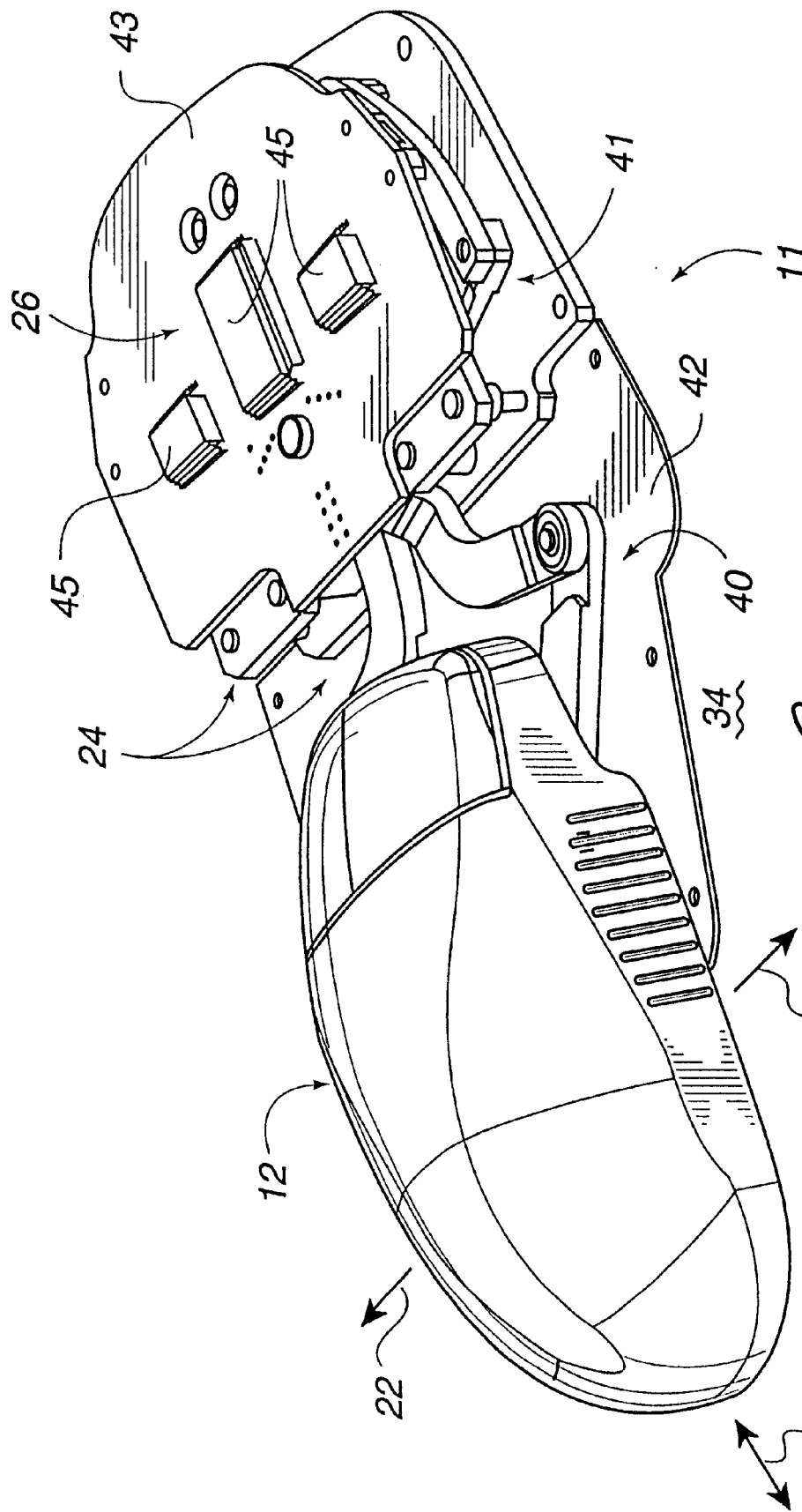
FIG. 2a is a perspective view of the mouse interface of FIG. 1 inside the housing.

FIG. 2a is a perspective view of a preferred embodiment of the mouse device 11 with the cover portion of housing 21 and the grounded pad 32 removed. Mouse 12 is preferably coupled to the mechanical portion 24 of interface 14, which includes a mechanical linkage 40 that is coupled to a transducer assembly 41. A base 42 is provided to support the mechanical linkage 40 and transducer system 41 on grounded surface 34. In the described embodiment, the linkage 40 allows mouse 12 two planar degrees of freedom in the directions of arrows 22, and the members of the linkage 40 move approximately within a plane. The linkage is preferably coupled to grounded base 42 at an axis of rotation, described below. The transducer assembly 41 is coupled to base 42 and is thus also grounded.

In the described embodiment, at least part of the electronic portion 26 of interface 14 is positioned above the transducer assembly 41. For example, a printed circuit board 43 or similar support can be positioned over the top surface of transducer assembly 41. A number of integrated circuits and other components 45 can be coupled to the printed circuit board 43. This configuration allows the transducer assembly 41 and the electronic portion 26 of the interface 14 to conform to a small volume which reduces the overall size of housing 21 and allows the mouse interface device to be positioned in convenient areas of a desktop or other area accessible to a user.

Figure 2B:
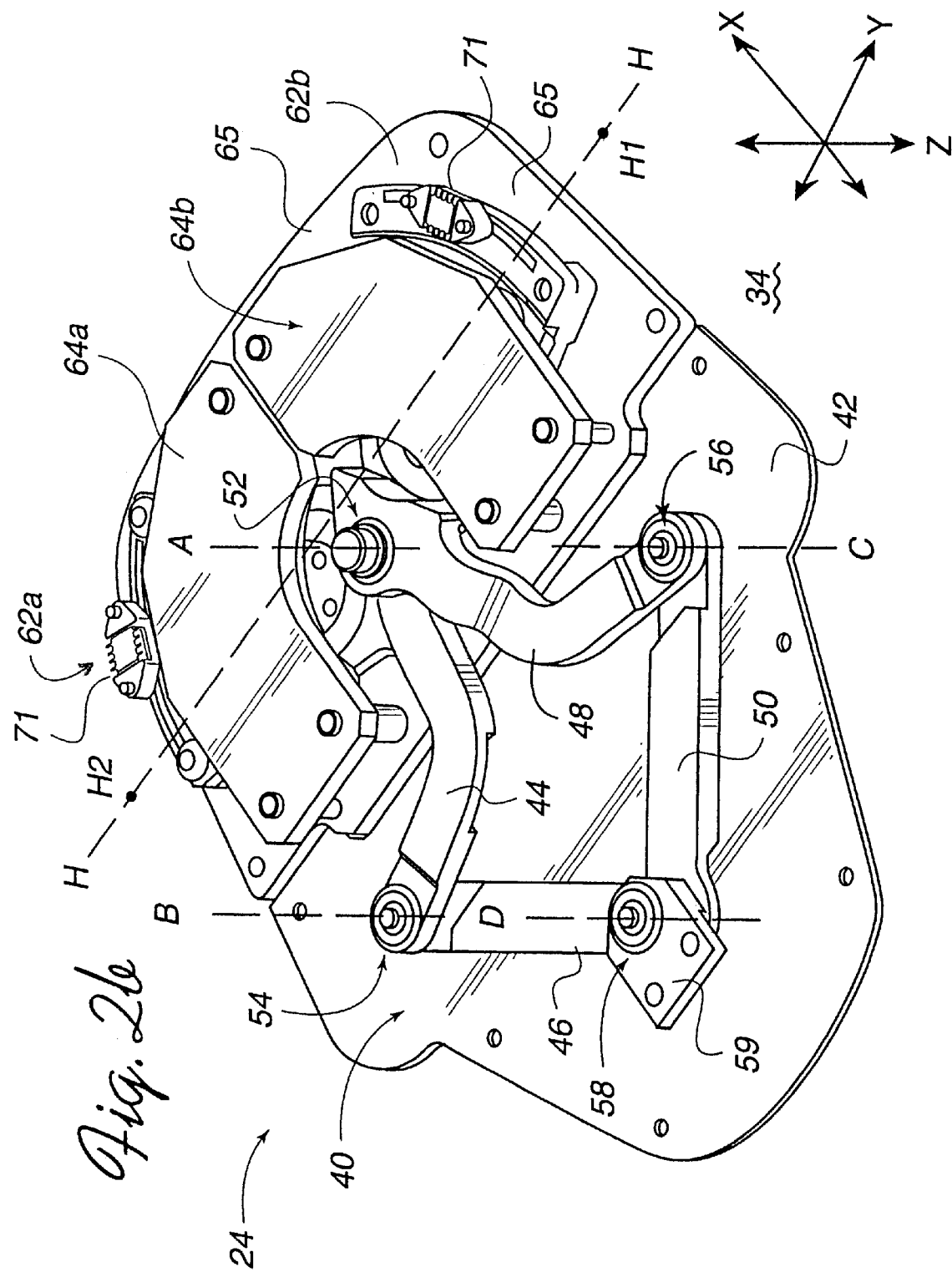
FIG. 2b is a perspective view of a mechanical portion of the mouse interface of FIG. 1.

FIG. 2b is a perspective view of a portion of the mouse device 11 of FIG. 2a showing the mechanical portion 24 of interface 14 for providing mechanical input and output in accordance with the present invention.

Mechanical linkage 40 provides support for mouse 12 and couples the mouse to a grounded surface 34, such as a tabletop or other support. Linkage 40 is, in the described embodiment, a 5-member (or "5-bar") linkage including a ground member 42 (the base), a first base member 44 coupled to ground member 42, a second base member 48 coupled to ground member 42, a first link member 46 coupled to base member 44, and a second link member 50 coupled to link member 46 and base member 48. In the described embodiment, the base member 44 and the link member 46 are arranged symmetrically from base member 48 and link member 50 across an axis extending perpendicularly through axes A and D. The symmetrical orientation of the members allows base member 44 and link member 46, in some embodiments, to be manufactured substantially in identical fashion as base member 48 and link member 50, thus saving on manufacturing costs. Mouse 12 is coupled to the linkage at the coupling between link members 46 and 50. Fewer or greater numbers of members in the linkage can be provided in alternate embodiments.

Ground member 42 of the linkage 40 is a base for the support of the linkage and is coupled to or resting on a ground surface 34. The ground member 42 in FIG. 2b is shown as a plate or base that extends under mouse 12. In other embodiments, the ground member can be shaped in other ways and might only contact the ground surface directly under bearing 52, for example.

The members of linkage 40 are rotatably coupled to one another through the use of rotatable pivots or bearing assemblies having one or more bearings, all referred to as "bearings" herein. Base member 44 is rotatably coupled to ground member 42 by a grounded bearing 52 and can rotate about an axis A. Link member 46 is rotatably coupled to base member 44 by bearing 54 and can rotate about a floating axis B, and base member 48 is rotatably coupled to ground member 42 by bearing 52 and can rotate about axis A. Link member 50 is rotatably coupled to base member 48 by bearing 56 and can rotate about floating axis C, and link member 50 is also rotatably coupled to link member 46 by bearing 58 such that link member 50 and link member 46 may rotate relative to each other about floating axis D. In an alternate embodiment, link member 46 can be coupled at its end to a mid-portion of link member 50 and mouse 12 can be coupled to the end of link member 50, as in a parallel linkage disclosed in co-pending patent application Ser. No. 08/881,691. The axes B, C, and D are "floating" in the sense that they are not fixed in one position relative to ground surface 34 as is axis A. Since the only connection of the four linkage members 44, 46, 48, and 50 to the ground member 42 is through grounded bearing 52, only base members 44 and 48 are grounded at axis A. Bearings 54, 56, and 58 are floating and not connected to the ground member. Preferably, the axes B, C, and D are all substantially parallel to each other.

The bearings used on linkage 40 can be of a wide variety of types. For example, a ball bearing assembly that includes rows of individual balls that ride in V-shaped grooves (bearing races) can be used. Alternatively, a snap bearing can be used, in which a cylindrical boss in one member mates with a cylindrical cavity included in a different member. A different type of bearing includes a V-shaped notch which mates with a V-shaped edge, where the angle between the sides of the notch is greater than the angle between the sides of edge by an amount greater than or equal to the desired range of angular motion provided by the bearing. These types of bearings are described in greater detail in parent patent application Ser. No. 08/881,691.

One advantage of the linkage 40 is that both base member 44 and base member 48 are rotatable about the same axis A. This is important to allow the actuator and sensor design of the present invention, as described in greater detail below. Also this configuration dramatically simplifies the kinematic equations required to describe the motion of mouse 12 and provide forces to mouse 12 at the other end of the linkage, such kinematic equations being well known to those of skill in the art. In alternate embodiments, members 44 and 48 can be coupled to ground member 42 at different locations and are rotatable about different axes, so that two grounded axes are provided, about which each member rotates. In yet other embodiments, the ground member 42 can be positioned between the base members 44 and 48 on axis A.

Linkage 40 is formed as a five-member closed-loop chain. Each member in the chain is rotatably coupled to two other members of the chain. The five-member linkage is arranged such that the members can rotate about their respective axes to provide mouse 12 with two degrees of freedom, i.e., mouse 12 can be moved within a planar workspace defined by the x-y plane, which is defined by the x- and y-axes as shown in FIG. 2b. Linkage 40 is thus a "planar" five-member linkage, since it allows the mouse 12 to be moved within a plane. In addition, in the described embodiment, the members 44, 46, 48 and 50 of linkage 40 are themselves approximately oriented in a plane.

Mouse 12 in the preferred embodiment is coupled to link members 46 and 50 by rotary bearing 58. The mouse may also preferably rotate about floating axis D and allow the user some flexible movement in the planar workspace. The allowed rotation can provided to allow the user's hand/wrist to conveniently stay in one position during mouse movement while the mouse 12 rotates about axis D. In alternate embodiments, mouse rotation about axis D may be sensed by sensors. In yet other embodiments, forces can be provided on mouse 12 about axis D using actuators. In the preferred embodiment, a pad or other support is provided under mouse 12 to help support the mouse 12, and is described in greater detail with respect to FIGS. 3a–c.

In alternate embodiments, capstan drive mechanisms (not shown) can be provided to transmit forces and motion between electromechanical transducers and the mouse 12. One example of the user of capstan drives is shown in parent application Ser. No. 08/756,745. In alternate embodiments, mouse 12 can also be moved in an additional spatial degree of freedom using a rotatable carriage coupled between ground member 42 and base member 44. Such an embodiment is described in greater detail with reference to co-pending patent application Ser. No. 08/736,161, incorporated by reference herein in its entirety.

Transducer system 41 is used to sense the position of mouse 12 in its workspace and to generate forces on the mouse 12. Transducer system 41 preferably includes sensors 62 and actuators 64. The sensors 62 collectively sense the movement of the mouse 12 in the provided degrees of freedom and send appropriate signals to the electronic portion of interface 14. Sensor 62a senses movement of link member 48 about axis A, and sensor 62b senses movement of base member 44 about axis A. These sensed positions about axis A allow the determination of the position of mouse 12 using known constants such as the lengths of the members of linkage 40 and using well-known coordinate transformations. Member lengths particular to the interface device can be stored in local memory 134, such as EEPROM, to account for manufacturing variations among different interface devices; alternatively, variations of the particular link lengths from standard lengths can be stored in memory 134.

Sensors 62 are, in the described embodiment, grounded optical encoders that sense the intermittent blockage of an emitted beam. A grounded emitter/detector portion 71 includes an emitter that emits a beam which is detected by a grounded detector. A moving encoder disk portion or "arc" 74 is provided at the end of members 44 and 48 which each block the beam for the respective sensor in predetermined spatial increments and allows a processor to determine the position of the arc 74 and thus the members 44 and 48 by counting the spatial increments. Also, a velocity of members 44 and 48 based on the speed of passing encoder marks can also be determined. In one embodiment, dedicated electronics such as a "haptic accelerator" may determine velocity and/or acceleration, as disclosed in co-pending patent application 08/804,535, filed Feb. 21, 1997, and hereby incorporated by reference herein. The operation of sensors 62 are described in greater detail with reference to FIGS. 4a–4c.

Transducer system 41 also preferably includes actuators 64 to transmit forces to mouse 12 in space, i.e., in two (or more) degrees of freedom of the user object. The bottom housing plate 65 of actuator 64a is rigidly coupled to ground member 42 (or grounded surface 34) and a moving portion of actuator 64a (preferably a coil) is integrated into the base member 44. The actuator 64a transmits rotational forces to base member 44 about axis A. The housing 65 of the grounded portion of actuator 64b is rigidly coupled to ground member 42 or ground surface 34 through the grounded housing of actuator 64b, and a moving portion (preferably a coil) of actuator 64b is integrated into base member 48. Actuator 64b transmits rotational forces to link member 48 about axis A. The combination of these rotational forces about axis A allows forces to be transmitted to mouse 12 in all directions in the planar workspace provided by linkage 40 through the rotational interaction of the members of linkage 40. The integration of the coils into the base members 44 and 48 is advantageous to the present invention and is discussed below.

In the preferred embodiment, actuators 64 are electromagnetic voice coil actuators which provide force through the interaction of a current in a magnetic field. The operation of the actuators 64 is described in greater detail below with reference to FIG. 4a. In other embodiments, other types of actuators can be used, both active and passive, such as DC motors, pneumatic motors, passive friction brakes, passive fluid-controlled brakes, etc.

Additional and/or different mechanisms can also be employed to provide desired degrees of freedom to mouse 12. This rotational degree of freedom can also be sensed and/or actuated, if desired, to provide an additional control degree of freedom. In other embodiments, a floating gimbal mechanism can be included between mouse 12 and linkage 40 to provide additional degrees of freedom to mouse 12. Optionally, additional transducers can be also added to interface 14 in provided or additional degrees of freedom of mouse 12.

In an alternate embodiment, the mechanism 14 can be used for a 3-D interface device that allows a user to move a user object 12 in three dimensions rather than the 2-D planar workspace disclosed. For example, in one embodiment, the entire mechanism 14 can be made to rotate about a grounded axis, such as axis H extending through the actuators 64. For example, members (not shown) rigidly coupled to the actuators 64 or to grounded member 42 can extend in both directions along axis H and be rotary coupled to a grounded surface at points H1 and H2. This provides a third (rotary) degree of freedom about axis H to the mouse device 11 and to the user object 12. A motor can be grounded to the surface near point H1 or H2 and can drive the mechanism 14 about axis H, and a sensor, such as a rotary encoder, can sense motion in this third degree of freedom. One reason for providing axis H through the magnet assemblies is to reduce the inertia and weight contributed to motion about axis H by the magnet assemblies. Axis H can be provided in other positions in other embodiments. In such an embodiment, the user object 12 can be a stylus, grip, or other user object. A third linear degree of freedom to mechanism 14 can be provided in alternate embodiments. One embodiment of a planar linkage providing three degrees of freedom is disclosed in co-pending patent application Ser. No. 08/736,161 now U.S. Pat. Ser. No. 5,828,197, filed Oct. 25, 1996 and hereby incorporated by reference herein.

Figure 3A:
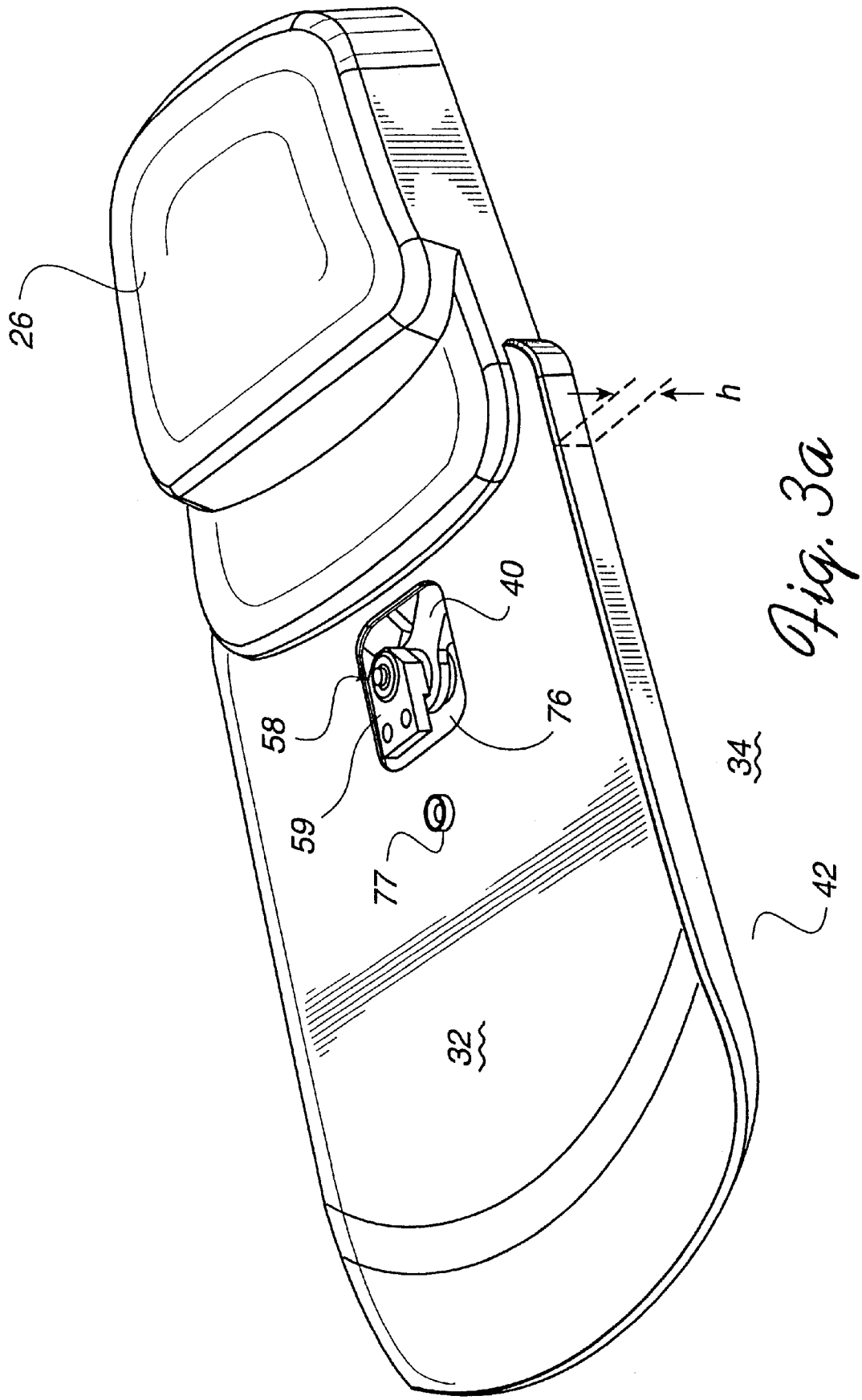

FIG. 3a is a perspective view of the grounded pad 32 and interface 14 of the mouse system shown in FIG. 1, where the mouse 12 has been detached from the mechanical linkage portion of the interface 14. As shown, pad 32 preferably has a height h and is preferably hollow to allow the mechanical linkage to be positioned underneath the top surface of the pad 32. The bearing 58 is preferably arranged to extend through a guide opening 76 in the pad 32. An attachment plate 59 can be coupled to the bearing 58 or rotatably coupled to a member of linkage 40 to provide a point for attaching the mouse 12 to the linkage 40. Mouse 12 is thus releasably coupled to attachment plate 59.

In the described embodiment, the pad 32 includes opening 76 in its top surface that provides the limits to the workspace of the mouse 12. Bearing 58 and plate 59 preferably protrude through opening 76 such that a rounded portion 63 of plate 59 (provided under the flat plate portion), when moved in any degree of freedom of the mouse 12, eventually impacts a side of opening 76. The four sides to the opening 76 thus provide limits to the workspace of the mouse 12 in the provided planar degrees of freedom, i.e., a stop mechanism is provided that limits the movement of the mouse 12 as defined by the size of opening 76. Opening 76 can be made any size desired. For example, in the described embodiment, opening 76 has relatively small dimensions, such as approximately 1⅜" by 1⅛". The size of the opening 76 is larger than the workspace of the mouse due to the size or radius of the rounded portion 63; thus, with the described opening size, a workspace of about 1" by ¾" is obtained for the mouse 12 (which is considered at the center of bearing 58 at axis D). This is typically adequate workspace for the user to move the mouse and control a graphical object such as a cursor on a display screen. In addition, this size workspace has an aspect ratio of 4:3, which is about the aspect ratio of a standard computer monitor, television, or other display screen. Preferably, the opening 76 has rounded corners that are receptive to the rounded portion 63 of plate 59, i.e., the rounded portion fits snugly into the rounded corner. In other embodiments, differently-sized guide openings 76 can be provided for differently-sized workspaces, or other types of stops or guides can be used to prevent movement past predetermined limits; e.g., guide opening 76 can be square shaped or otherwise shaped.

An aperture 77 can also be provided to route wires or cables from buttons 15 on the mouse to the electronic portion 26 of the mouse device 11. Alternatively, an inductive coil can be included in mouse 12 to transmit a signal when a button is activated, where the signal is received by another inductive coil in pad 32 which detects the activation of buttons 15; the operation of such coils being well known to those skilled in the art. Other wireless devices can also be used to detect the activation of buttons 15.

Preferably, the top surface of grounded pad 32 is a smooth material, such as a smooth slick plastic, to allow contact with portions of mouse 12. Such contact provides support for mouse 12 when the mouse is moved in its planar workspace and allows the mouse to slide on the pad 32 with little friction. Since the linkage 40, when extended, is cantilevered at a large moment arm, a small force at the mouse end of the linkage can create a large torque that stresses the mounting or coupling 52 at axis A, which may cause the mounting or coupling to bend. Pad 32 (and roller 61) thus balances the cantilever load by providing support to any pressure or force from the user in the z-direction on mouse 12 toward the ground surface 34.

Figure 3B:
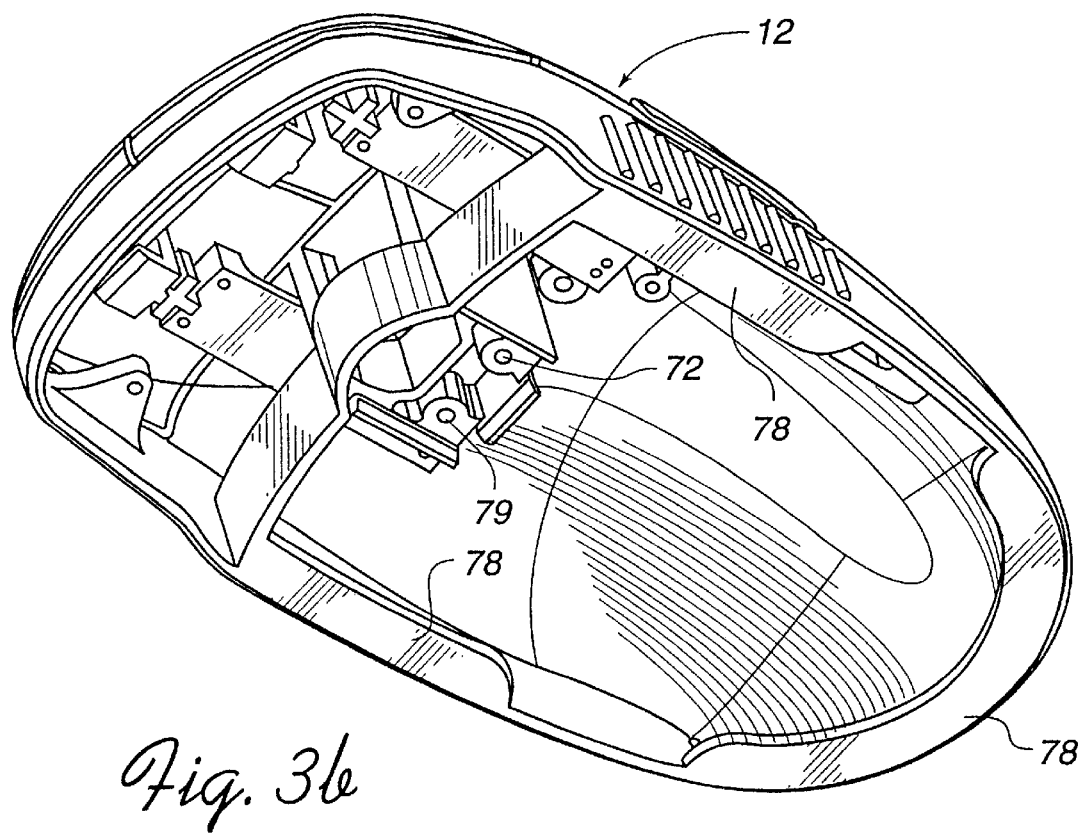

FIG. 3b is a perspective view of the underside of mouse 12. Preferably, mouse 12 includes edges 78 provided as a lip to a hollow interior of the mouse 12. Edges 78 are preferably coated with a Teflon or similar smooth material, and are operative to contact the smooth top surface of grounded pad 32 to allow smooth movement of the mouse on the pad with little friction. In the described embodiment, mouse 12 is attached to plate 59 at apertures 79; for example, screws, posts, or other members can be inserted in the apertures of plate 59 and in apertures 79.

Figure 3C:
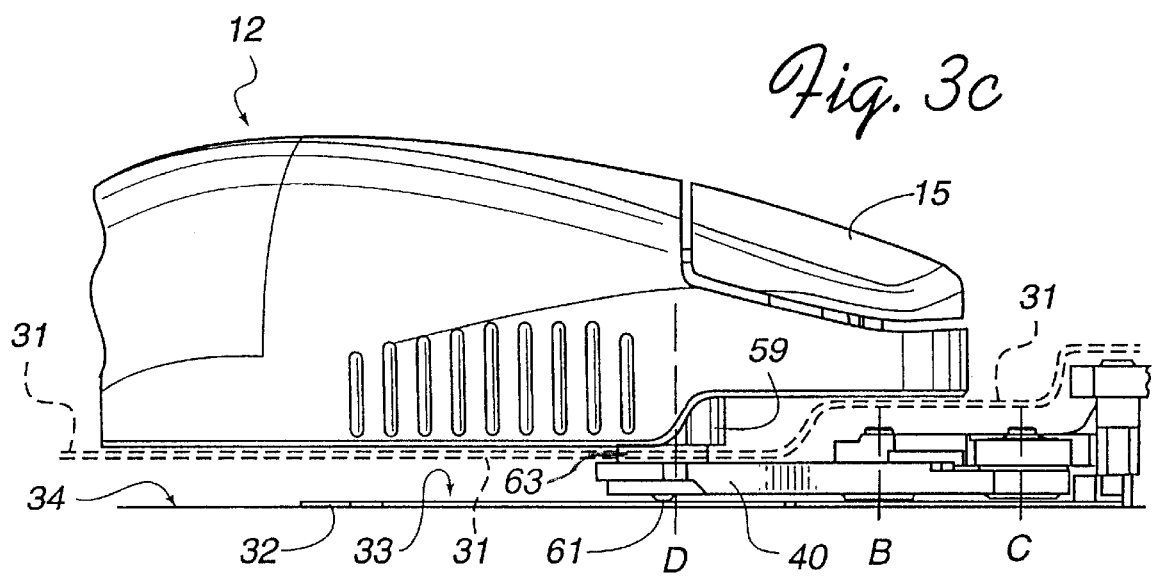
FIG. 3c is a side elevational view of the mouse interface of FIG. 2.

FIG. 3c is a side elevational view of the mouse 12 coupled to linkage 40 and contacting grounded pad 32. Preferably, grounded pad 32 includes a bottom support member 33 which contacts the grounded surface 34 and which is a hard smooth material (such as a lightweight metal). Linkage 40 is preferably supported on the surface of member 33 by a roller 61. Roller 61, in the described embodiment, is a spherical ball-shaped piece, e.g. having a surface made of Teflon, that is coupled to linkage 40 and slides on the surface of member 33 when the mouse 12 is moved in its workspace. Alternatively, roller 61 can be rotatably coupled to the linkage 40 and can rotate on the surface of member 33 when the mouse 12 moves. Roller 61 thus supports the linkage 40 to receive the force from the user's hand on the mouse 12 without being stressed in the z-direction. The top surface of grounded pad 32 is not shown in FIG. 3c, but is also present such that the linkage 40 is positioned between an upper member 31 and member 33. The top surface of the upper member receives downward force on mouse 12 since the edges 78 of mouse 12 slide on this surface.

In other embodiments, other types of supports can be used to support the bearing 58 end of linkage 40 and which allow little friction between mouse and pad surface, such as a wheel, runner, etc. In other embodiments, a pad or other support can be coupled to the underside of linkage 40 such as at bearing 58, or at other areas between mouse 12 and grounded surface 34.

Figure 4A:
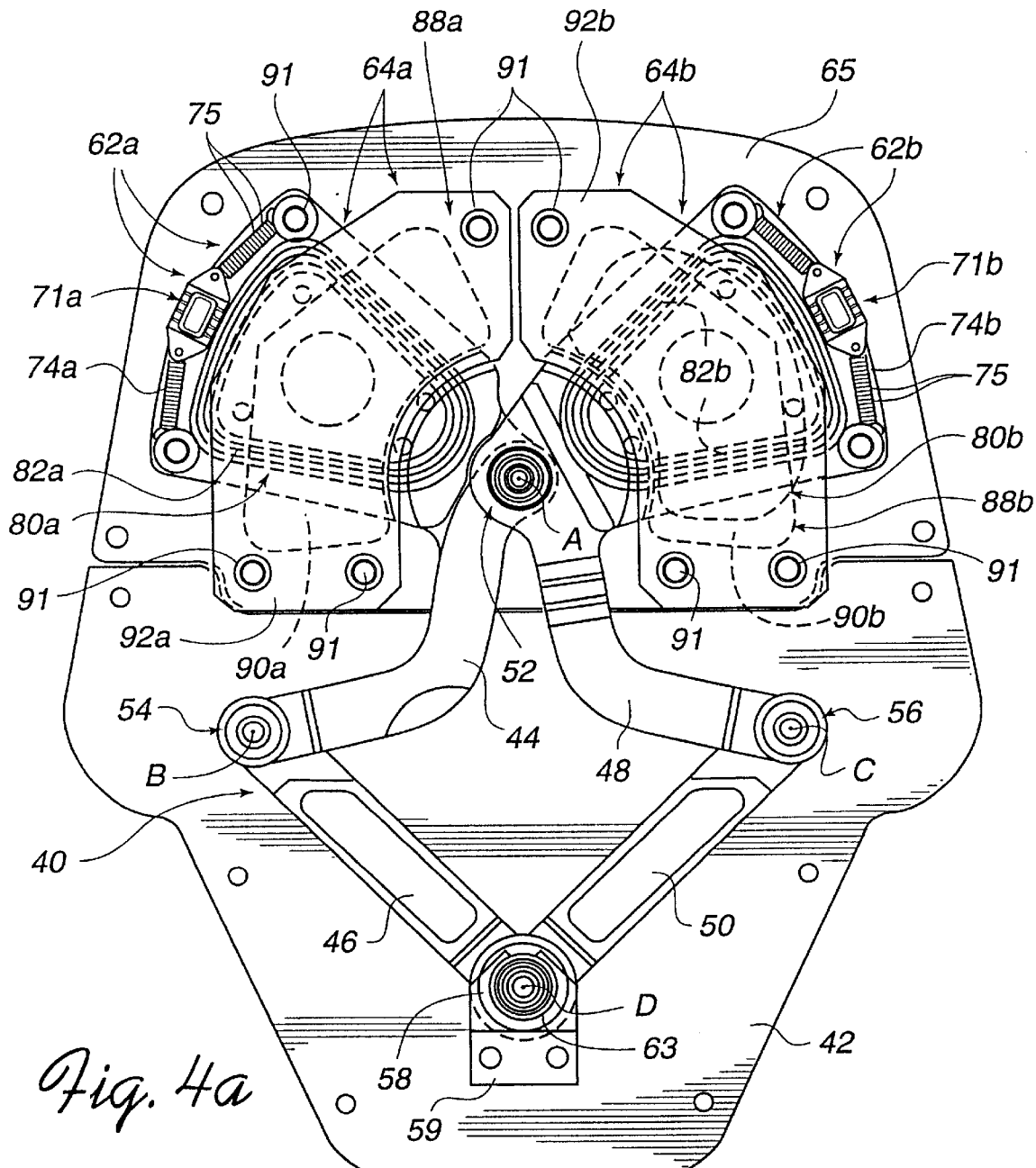
FIG. 4a is a top plan view of the mechanical portion of the mouse interface of FIG. 2b.

FIG. 4a is a top plan view of the mechanical portion 24 of the interface device 11 showing the arrangement of sensors and actuators in the device. The present invention preferably uses voice coil actuators, some embodiments of which are described in detail in patent application Ser. Nos. 08/560,091 and 08/881,691, incorporated by reference herein.

Actuator 64*a* drives base member 44. Base member 44 includes an integrated coil portion 80*a* on which a wire coil is provided. Coil portion 80*a* may be of the same material as the remaining portion of member 44, or it may include a circuit board material (with a suitable dielectric, etc.) which promotes easy layout and etching of a coil on its surface. A wire coil 82*a* of actuator 64*a* is coupled to portion 80*a* of member 44. Preferably, wire coil 82*a* includes at least two loops of wire and is wound on a member portion 80*a*, e.g. 222 loops, in the described embodiment, are wound like a spool about a center portion of portion 80*a*. In alternative embodiments, coil 82*a* can be provided as a printed circuit board trace using well-known techniques. Fewer or greater numbers of loops of coil 82*a* can also be provided. Terminals (not shown) from wire coil 82*a* to the electronic portion 26 of the interface are provided so that host computer 18 or local microprocessor 130 can control the direction and/or magnitude of the current in wire coil. The coil 82*a* can be made of aluminum, copper, or other conductive material.

The coil portion of actuator 64*a* is integrated in base member 44 and pivots about A as the base member so pivots. This feature is one of the advantages of the present invention. In typical prior art force feedback linkages, the actuator is a supported by a set of bearings which are separate from the bearings which support a member of the linkage. In the device of the present invention, a single bearing 52 is a grounded bearing of the linkage and a guide bearing for the actuator 64, since base member 44 is part of both the linkage 40 and the actuator 64*a*. This is more efficient than having separate bearings since one part serves two functions, which reduces the cost of the device and friction among the moving parts.

Figure 4B:
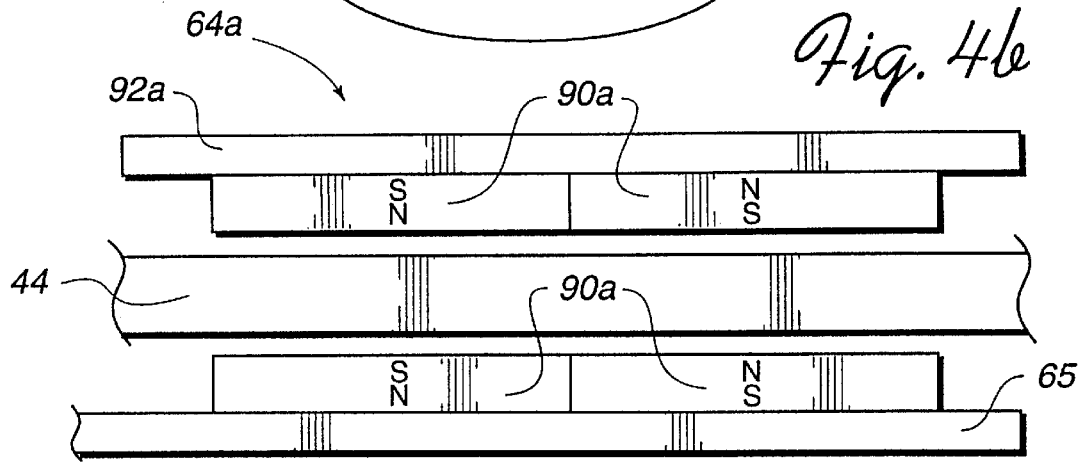
FIG. 4b is a side elevational view of the actuators of the mouse interface.

Voice coil actuator 64*a* also includes a magnet assembly 88*a*, which is grounded and preferably includes four magnets 90*a* and a flux plate 92*a*, as shown more clearly in the side elevation view of FIG. 4*b*. Alternatively, two magnets 90 with two polarities each can be included. Each magnet has a polarity (north N or south S) on opposing sides of the magnet. Opposite polarities of magnets 90 face each other, such that coil 82*a* is positioned between opposing polarities on either side of the coil. In an alternate embodiment, one or more magnets 90 can be provided on one side of coil 82*a*, and the other magnet 90 on the opposite side of the coil 82*a* can be a piece of metal shaped similarly to the magnet that provides a flux return path for the magnetic field (or the piece of metal can simply be plate 65); this can be more cost efficient in some embodiments. When magnets are provided on only one side of the coil, the magnets are made larger to provide the same amount of force as if two sides of (smaller) magnets are present. Preferably, a small amount of space is provided between the magnet surfaces and the coil 84*a*/member 44. The magnetic flux guide surrounding the magnets is provided as, in the described embodiment, metal plate 92*a* provided on the top side of the magnets 90*a* and metal base plate 65 provided on the bottom side of the actuator 64*a*. Plates 92*a* and 65 house actuator 64*a* to allow magnetic flux from magnets 90*a* to travel from one end of the magnets 90*a* to the other end, as is well known to those skilled in the art.

The magnetic fields from magnets 90*a* interact with a magnetic field produced from wire coil 82*a* when current is flowed in coil 82*a*, thereby producing forces on member 44. Coil 82*a* and member 44 are positioned between magnets 90*a* and are thus affected by the magnetic fields of opposing magnets. As an electric current I is flowed through the coil 82*a* via electrical terminals, a magnetic field is generated from the current and configuration of coil 82*a*. The magnetic field from the coil then interacts with the magnetic fields generated by magnets 90*a* to produce a force on member 44 about axis A. The magnitude or strength of the force is dependent on the magnitude of the current that is applied to the coil, the number of loops in the coil, and the magnetic field strength of the magnets. The direction of the force depends on the direction of the current in the coil; the force can be applied in either direction about axis A. By applying a desired current magnitude and direction, force can be applied to member 44 and through member 46, thereby applying force to mouse 12 in the x-y plane workspace of the mouse. A voice coil actuator can be provided for each degree of freedom of the mechanical apparatus to which force is desired to be applied.

Thus, the magnetic fields from magnets 90*a* interact with the magnetic field produced from wire coil 82*a* when current is flowed in coil 82*a* to produce a planar force to the coil portion 80*a* of the member 44. The coil portion 80*a* and wire coil 82*a* are moved about axis A until the member 44 contacts the stop supports 91 provided at each end of the range of motion of the member 44 about axis A (guide opening 76 may also limit the range of the actuators in some embodiments). Alternatively, the physical stops to movement can be omitted, where the force on member 44 is gradually decreases and ceases as the coil portion 80*a* moves out from between the magnets 90*a*.

Voice coil actuator 64*b* operates similarly to actuator 64*a*. A current is flowed through coil 82*b* to cause interaction with a magnetic field from magnets 90*b* of magnet assembly 88*b* which is similar to the magnet assembly 88*a* described above, and inducing magnetic forces that rotate portion 80*b* of base member 48 about axis A. This causes forces to be applied to mouse 12 in the x-y workspace of the mouse through the member 48 and member 50. It should be noted that magnet assembly 88*b* includes a different flux return plate 92*b* on the top of actuator 64*b*, but preferably uses the same base plate 65 for the flux return path on the bottom of actuator 64*b*. This conveniently allows a single plate 65 to be used as a flux return path for both actuators 64*a* and 64*b*.

In the described embodiment, magnet assemblies 88*a* and 88*b* are preferably positioned adjacent to each other to provide a low profile. This allows housing 21 to have a low profile as well, and permits the mouse interface device 11 to be placed conveniently in locations on a desktop near a host computer. In addition, the low profile embodiment allows easier and thus cheaper assembly of the interface device 11. In an alternate embodiment, such as disclosed in parent application Ser. No. 08/881,691, the grounded magnet assemblies can be stacked, one on top of the other. For example, a plate can be provided between the actuators and a portion of the flux path between the two magnetic assemblies can be shared by both actuators.

An important advantage of the present invention is the linkage 40 which provides a single rotation axis A for both base members 44 and 48. Since the base members 44 and 48 of the present invention also integrate the moving wire coil portion of the actuators, the moving portion of the actuators thus also rotate about the same axis A. The members 44 and 48, in effect, act as guides for the movement of the coils.

A further advantage of integrating the coils 82 with the grounded base members 44 and 48 is that mechanical advantage is gained from the length of the base members. The two base members 44 and 48 are coupled to a single pivot point at a mid-point of the base members, where one end of each base member includes a coil; the coils are thus spaced from the pivot. The mechanical advantage is derived from the ratio of the distance from the coil to the rotation point (axis A) and the distance from the rotation point to the other end of the member at the bearing 54 or 56. The base members 44 and 48 thus act as lever arms, and the lever arm distance provides mechanical advantage to forces generated by the actuators 64 and transmitted through linkage 40 to mouse 12.

The voice coil actuators 64a and 64b have several advantages. One is that a limited movement range is defined for a particular degree of freedom of mouse 12 by the length of the magnets 90 and the stops 91. Also, control of the voice coil actuator is simpler than other actuators since output torque is a substantially linear function of input coil current. In addition, since voice coil actuators do not require mechanical or electrical commutation as do other types of motors, the voice coil actuator has a longer life expectancy, less maintenance, and quiet operation. The actuation is nearly frictionless, resulting in greater haptic fidelity and smoother feel to the user. The parts for voice coil actuators are inexpensive to produce and are readily available, such as voice coil driver chips, resulting in a low cost way to provide realistic force feedback.

In the particular embodiment disclosed, another advantage relates to the grounding of both actuators 64a and 64b. The heavy portion of the electromagnetic actuators (the magnets and the housing for the magnets) are grounded, while the lighter portion of the actuators (the coils) are not grounded and ride on members of the linkage. Since both actuators are coupled to ground, the user moving mouse 12 does not carry the heavy portion of the actuators or feel their weight, thus promoting realistic force feedback using smaller magnitude forces, and allowing the interface system 10 to be a low cost device.

In alternate embodiments, the mechanical linkage 40 can be replaced by other mechanical linkages or structures which can provide desired degrees of freedom. For example, portions 80a and 80b of the members 44 and 48 can be linearly moved through sensors 62 and linear actuators can provide forces in linear degrees of freedom of mouse 12. In other embodiments in which rotary degrees of freedom are desired for a user object, linear degrees of freedom can be provided in the X and Y axes and can be converted to two rotary degrees of freedom for a user object 12 using a ball joint, pendulum, or other mechanism.

In the preferred embodiment, separate sensors 62 are used to detect the position of mouse 12 in its planar workspace, as described below. However, in alternate embodiments, the voice coil actuators 64a and 64b can also be used as sensors to sense the velocity of the members 44 and 48 about axis A and/or to derive the position and other values of mouse 12 in its planar workspace from the sensed velocity. Motion of coil 82a within the magnetic field of magnets 90a induces a voltage across the coil 82a and this voltage can be sensed by an analog-to-digital converter or other electronics, for example. This voltage is proportional to the velocity of the coil and portion 80 of the rotating member about axis A. From this derived velocity, acceleration or position of the members 44 and 48 can be derived using timing information, for example, from a clock (described below). Alternatively, one or more additional coils similar to coil 82a and having an appropriate number of loops can be placed on member portions 80 which are dedicated to sensing voltage to derive position, velocity, or acceleration as described above. However, voice coil actuators produce analog values, which are subject to noise, and the filtering of such noise typically requires expensive components; thus, in the preferred low-cost embodiment, separate digital sensors are used to sense the position, motion, etc. of mouse 12.

In other embodiments, additional coils can also be provided for actuators 64 to provide different magnitudes of forces. For example, coil 82a can include multiple separate "sub-coils" of wire. A set of terminals can be included for each different sub-coil. Each sub-coil can include a different number of loops on portion 80 and therefore will generate a different magnetic field and thus a different magnitude of force when a constant current I is flowed through the sub-coil. This scheme is also applicable to a digital system using on and off switches. This embodiment is described in greater detail in co-pending application Ser. No. 08/560,091.

In other embodiments, linear actuators can be used to provide forces in provided degrees of freedom. Some examples of linear electromagnetic actuators are described in patent application Ser. No. 08/560,091. Also, other types of actuators may be used in place of or in addition to actuators 64 of the interface device. For example, the linkage can be driven by a direct drive DC motor or a geared/belt DC motor to provide mechanical advantage.

Sensors 62a and 62b are provided to sense the position of mouse 12 in its planar workspace. In the described embodiment, a grounded emitter/detector assembly 71a is provided for sensor 62a and a grounded emitter/detector assembly 71b is provided for sensor 62b. Preferably, the emitter and detector in each assembly 71 are provided on the same side of the encoder arc 74; for example, they are provided on the upper side of the arc in the described embodiment. The emitter portion emits a beam that impinges on the encoder arc 74. Encoder arc 74 includes a number of reflective line marks 75 which are very closely spaced together and are separated by a different, non-reflective material (the width and spacing of marks 75 are exaggerated in FIG. 4a for clarity). Thus, the beam from the emitter is reflected to the detector of the assembly 71 when a reflective mark is positioned at the point where the beam impinges the arc 74. When the encoder arc 74 moves such that a non-reflective portion is at the beam impinging location, the beam is not reflected and the detector does not detect the beam. Thus, the detector senses each reflective mark as it passes through the beam when the encoder arc 74 is moved on member 44 or 48. The detector outputs a sensor signal or pulse indicating each time a mark passes through the beam. Since sensor 62 in the described embodiment is a quadrature encoder, the detector preferably includes 2 individual spaced apart detectors providing four times the resolution, as is well known to those skilled in the art. A suitable optical quadrature encoder which performs the functions described above is model HEDR-8100 from Hewlett Packard. Other types of emitter-detector pairs can also be used in other embodiments.

The more closely spaced the marks are, the finer the resolution of the sensor 62. For example, in the preferred embodiment, a mark spacing on the arc can be about 200–500 lines per inch, providing four times that resolution in a quadrature encoder. By counting the number of marks passing through the beam, the position of the member 44 (for sensor 62a) or member 48 (for sensor 62b) about axis A is known. The velocity and/or acceleration of the members 44 and 48 can also be derived from the position data and timing information, as described above. From the positions of the base member 48 and the base member 44 about axis A, the position of mouse 12 can be determined.

Alternate embodiments can include sensors 62a and/or 62b (and/or actuators 64) in different positions. For example, the emitter and detector can be on opposite sides of arc 74. In yet other embodiments, other types of sensors can be used. For example, a single sensor can be used to detect motion in both degrees of freedom. Alternatively a rotary sensor including a friction wheel can be provided; or, a planar sensor or "touch pad" having rectangular sensing area and a pointer can be used to sense the x and y position and/or pressure in the z-direction. A light pipe can also be used to direct the beam emitted from the emitter to the detector for sensor 62a and/or 62b. These alternate embodiments are described in detail in parent patent application Ser. No. 08/881,691, incorporated by reference herein.

In FIG. 4a, the mouse 12 (not shown) coupled to bearing 58 is approximately at a neutral position approximately at the center of the mouse workspace where the members 44 and 46 are approximately symmetrical in position with the members 48 and 50 across the axis extending through axes A and D. Coil portions 80a and 80b of members 44 and 48 are approximately centered in the range of the optical encoder sensors 62a and 62b and within the range of magnet assemblies 88a and 88b.

Figure 4C:
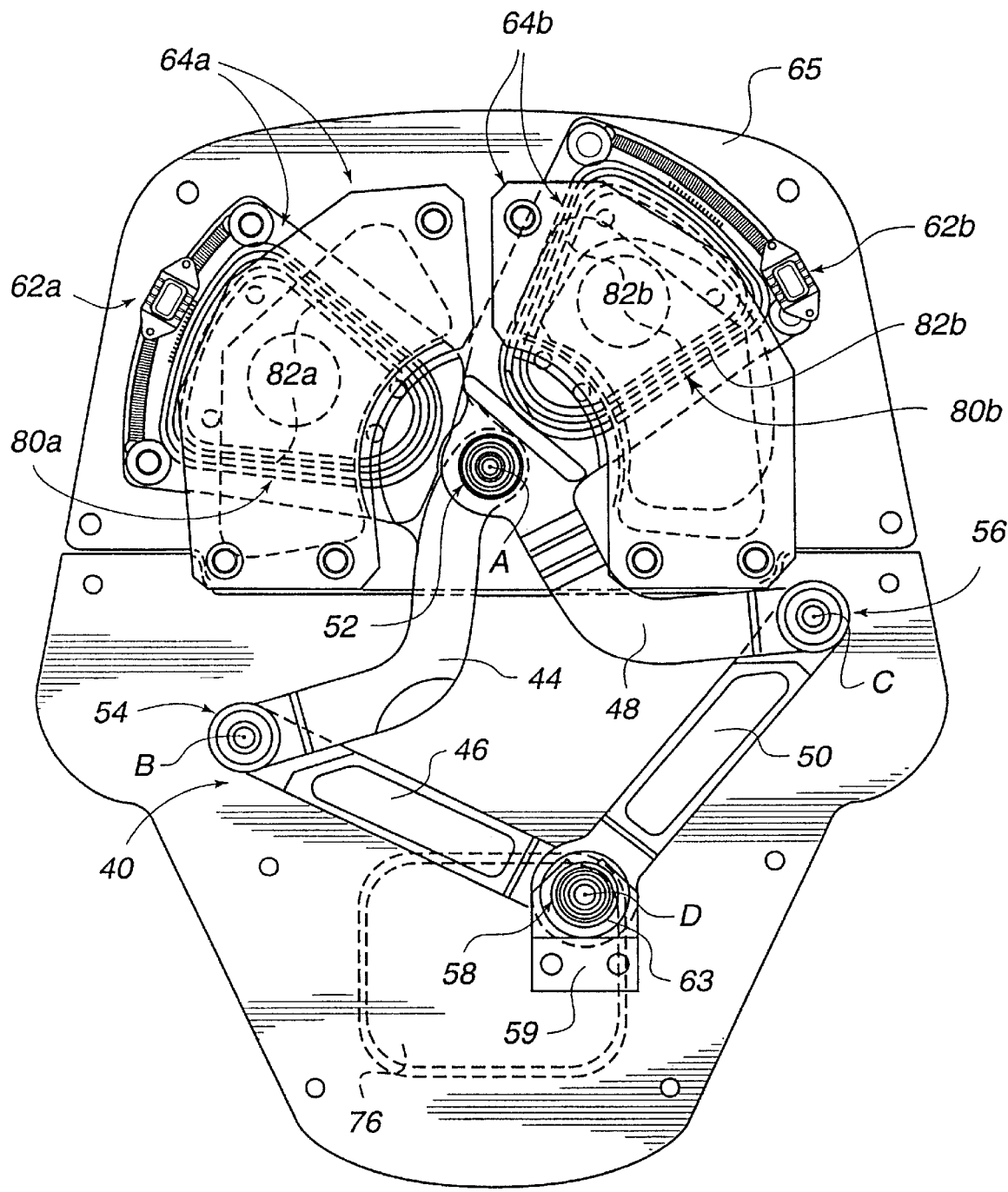
FIG. 4c is a top plan view of the mechanical portion of the mouse interface after the linkage has been moved.

FIG. 4c is a detailed top plan view of the mechanical portion 24 of the mouse interface device 11 similar to FIG. 4a and showing the linkage 40 in a different position. In FIG. 4c, the mouse 12 (not shown) and axis D have been moved in the x-y plane of the workspace of the mouse. The movement of the mouse has been limited by the guide opening 76, where plate 59 has engaged the sidewall of the upper-right corner area of guide opening 76 and stops any further movement in the forward y-direction and right x-direction. Linkage 40 and portions 80 of members 44 and 48 have moved in a counterclockwise direction about axis A compared to their positions in FIG. 4a. Sensor 62a has detected the movement of portion 80a by sensing the movement of the marks 75 on encoder arc 74a. Likewise, sensor 62b has detected the movement of portion 80b by sensing the movement of the encoder arc 74b.

Figure 5A:
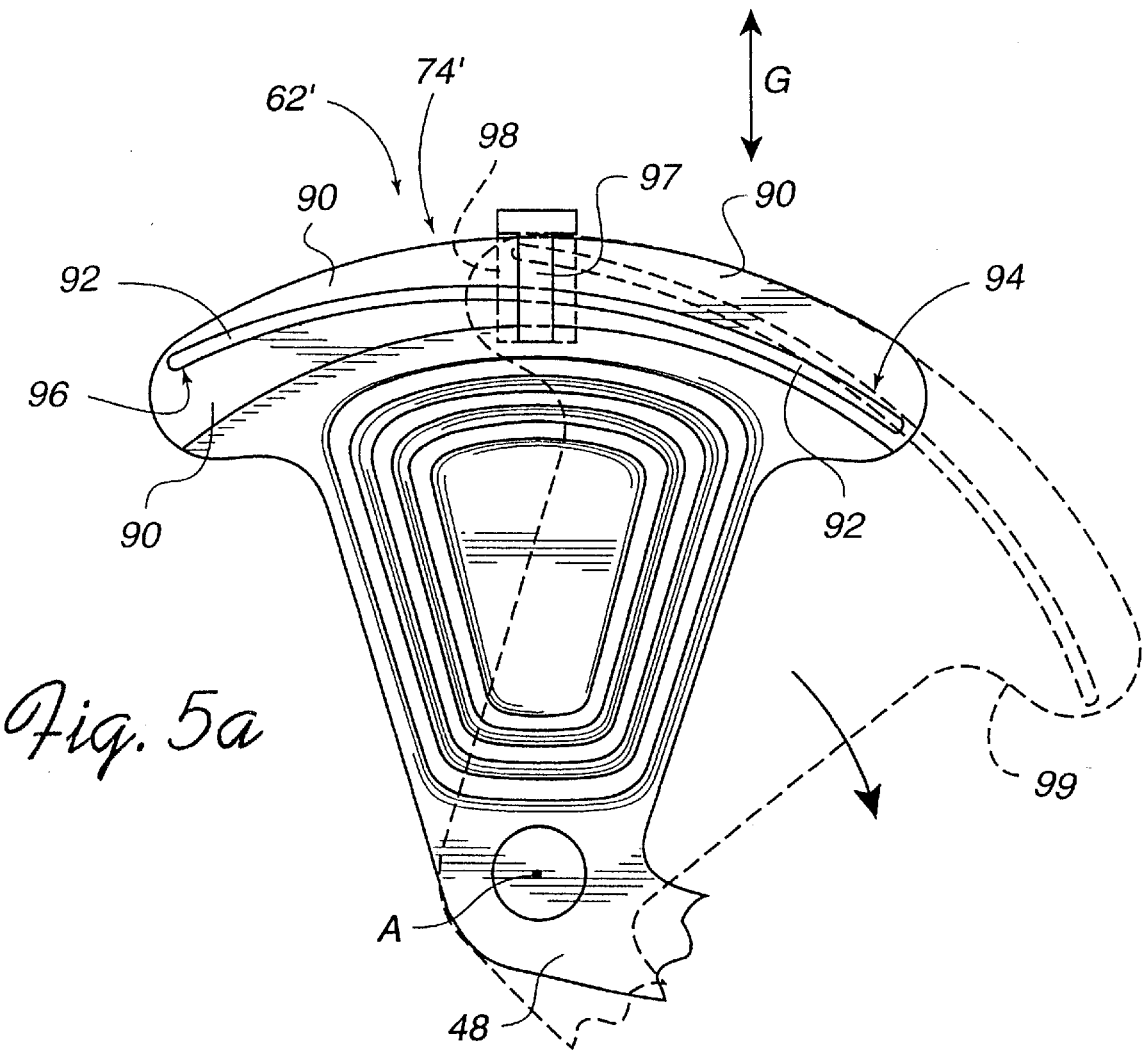
FIGS 5a and 5b are top plan and side elevational views, respectively, of an alternate sensor of the present invention.

FIG. 5a is a top plan view of an alternate embodiment 62' of the sensors 62a and 62b. In the above embodiment, the encoder arc 74 provided on the edge of member 44 and member 48 includes a plurality of spaced apart reflective line marks 75 which are positioned perpendicularly to the direction of rotational travel of the arc 74. In the embodiment of FIG. 5a, an arc 74' is also provided in a location similar to the arc 74 of FIG. 4a. For example, arc 74' is provided on the edge of member 48 (or member 44) at the edge of actuator portion 80b. Arc 74' is thus operative to rotate about axis A with member 48. Arc 74' includes an opaque portion 90 and a transparent strip 92. Strip 92 is positioned such that, at end 94 of the arc 74', the strip 92 is positioned at its closest point to axis A. At end 96 of the arc 74', the strip 92 is positioned at its furthest distance from axis A. The strip 92 extends between ends 94 and 96 in a continuous smooth curve as shown in FIG. 5a. Strip 92 is referred to herein as "skewed," indicating its distance from the center of rotation A varies along its length.

Figure 5B:
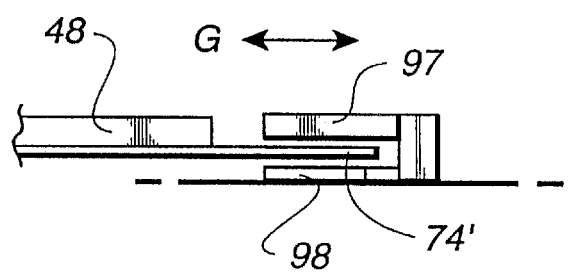

Sensor 62' also includes an emitter 97 and a detector 98, as more clearly shown in the side elevational view of FIG. 5b. Emitter 97 is positioned above arc 74' and can include a photo diode or other source of a beam of electromagnetic energy. The beam is directed toward detector 98, which is positioned on the other side of arc 74'. Detector 98 preferably is a lateral effect photodiode, photosensitive strip, other type of differencing sensor, or other type of sensor that can detect the location of the emitted beam on the detector. In the described embodiment, the detector 98 need only detect the position of the beam in one dimension, e.g. parallel to an axis G. The emitter and detector positions can be reversed in alternate embodiments.

The sensor 62' operates as follows. A beam that is wide enough to cover the entire length of the detector is emitted from emitter 97. Transparent strip 92 allows a portion of the beam to pass through at the position of the strip above the detector 98, while the opaque portion 90 blocks the other portions of the beam. The detector senses the location of the transmitted portion of the beam through the strip on the detector. When the arc 74' moves, the strip 92 changes its position along axis G, so that a different position of the transmitted portion of the beam is detected on detector 98. Thus, each incremental position of arc 74' provides the beam on a slightly different location on the detector 98, allowing the detector to sense the position of the arc 74' and the member 48. For example, in the position of FIG. 5a, the strip 92 is located at about the center position of the detector on axis G. In the dashed line position 99 of the arc 74', the strip 92 and beam is positioned much closer to the end of the detector 98. By transmitting this data to the microprocessor or host computer, the position of the arc and member 48 can be determined based on the known movement range of the arc and the corresponding locations of the beam at the extreme positions of that range.

In an alternate embodiment, sensor 62' can use reflection similar to the sensor 62 described with reference to FIG. 4a. Thus, both emitter and detector can be positioned on the same side of arc 74'. The opaque portion 90 can be implemented as transparent or absorbent material, while the transparent strip 92 can be implemented as a reflective strip similar to the line markings 75 of FIG. 4a. Thus, the beam from the emitter 97 will be reflected to the detector 98 when the beam impinges on the strip 92, where the location of the strip along axis G will cause the reflected beam to have a unique detected position on the detector 98 based on the position of the arc 74' about axis A. Portions of the emitted beam that impinge on the absorbent or transparent portions 90 will not be reflected and thus not detected by detector 98.

Figure 6:
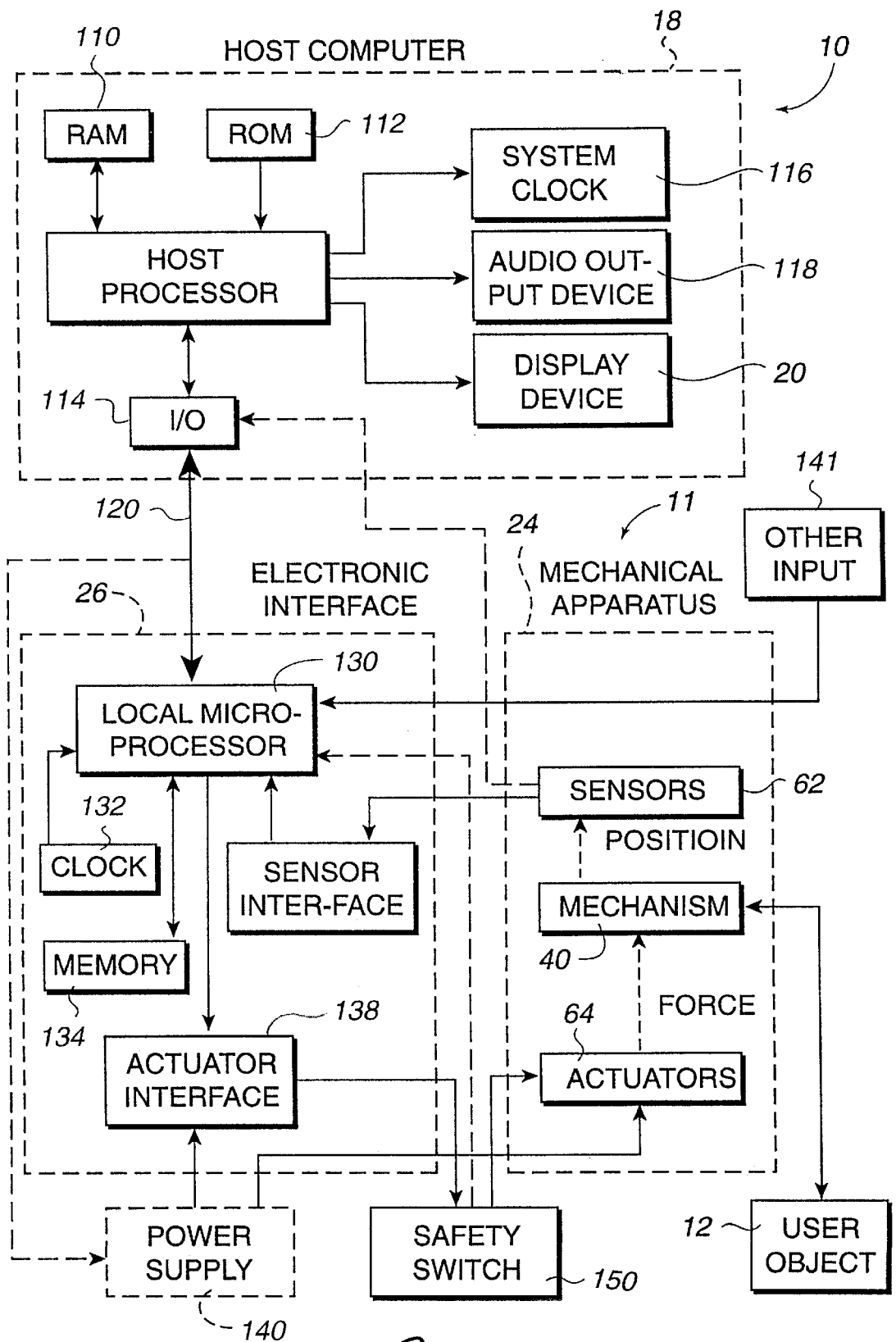
FIG. 6 is a block diagram of the system of FIG. 1 for controlling a force feedback interface device of the present invention.

FIG. 6 is a block diagram illustrating the electronic portion of interface 14 and host computer 18 suitable for use with the present invention. Mouse interface system 10 includes a host computer 18, electronic interface 26, mechanical portion 24, and mouse or other user object 12. Electronic interface 26, mechanical portion 24, and mouse 12 can also collectively be considered the "force feedback interface device" 11 that is coupled to the host computer. A similar system is described in detail in co-pending patent application Ser. No. 08/566,282, which is hereby incorporated by reference herein in its entirety.

As explained with reference to FIG. 1, computer 18 is preferably a personal computer, workstation, video game console, or other computing or display device. Host computer system 18 commonly includes a host microprocessor 108, random access memory (RAM) 110, read-only memory (ROM) 112, input/output (I/O) electronics 114, a clock 116, a display device 20, and an audio output device 118. Host microprocessor 108 can include a variety of available microprocessors from Intel, AMD, Motorola, or other manufacturers. Microprocessor 108 can be single microprocessor chip, or can include multiple primary and/or co-processors. Microprocessor 108 preferably retrieves and stores instructions and other necessary data from RAM 110 and ROM 112 as is well known to those skilled in the art. In the described embodiment, host computer system 18 can receive sensor data or a sensor signal via a bus 120 from sensors of system 10 and other information. Microprocessor 108 can receive data from bus 120 using I/O electronics 114, and can use I/O electronics to control other peripheral devices. Host computer system 18 can also output commands to interface device 104 via bus 120 to cause force feedback for the interface system 10.

Clock 116 is a standard clock crystal or equivalent component used by host computer 18 to provide timing to electrical signals used by host microprocessor 108 and other components of the computer system 18. Clock 116 is accessed by host computer 18 in the control process of the present invention to provide timing information that may be necessary in determining force or position, e.g., calculating a velocity or acceleration from position values.

Display device 20 is described with reference to FIG. 1. Audio output device 118, such as speakers, can be coupled to host microprocessor 108 via amplifiers, filters, and other circuitry well known to those skilled in the art. Host processor 108 outputs signals to speakers 118 to provide sound output to the user when an "audio event" occurs during the implementation of the host application program. Other types of peripherals can also be coupled to host processor 108, such as storage devices (hard disk drive, CD ROM drive, floppy disk drive, etc.), printers, and other input and output devices.

Electronic interface 26 is coupled to host computer system 18 by a bidirectional bus 120. The bidirectional bus sends signals in either direction between host computer system 18 and the interface device 104. Bus 120 can be a serial interface bus providing data according to a serial communication protocol, a parallel bus using a parallel protocol, or other types of buses. An interface port of host computer system 18, such as an RS232 serial interface port, connects bus 120 to host computer system 18. In another embodiment, an additional bus can be included to communicate between host computer system 18 and interface device 11.

One preferred serial interface bus used in the present invention is the Universal Serial Bus (USB). The USB standard provides a relatively high speed serial interface that can provide force feedback signals in the present invention with a high degree of realism. USB can also source power to drive actuators 64 and other devices of the present invention. Since each device that accesses the USB is assigned a unique USB address by the host computer, this allows multiple devices to share the same bus. In addition, the USB standard includes timing data that is encoded along with differential data.

Electronic interface 26 includes a local microprocessor 130, local clock 132, local memory 134, sensor interface 136, and actuator interface 138. Interface 26 may also include additional electronic components for communicating via standard protocols on bus 120. In various embodiments, electronic interface 26 can be included in mechanical portion 24, in host computer 18, or in its own separate housing. Different components of interface 26 can be included in portion 24 or host computer 18 if desired.

Local microprocessor 130 preferably coupled to bus 120 and may be closely linked to mechanical portion 24 to allow quick communication with other components of the interface device. Processor 130 is considered "local" to interface device 11, where "local" herein refers to processor 130 being a separate microprocessor from any processors 108 in host computer 18. "Local" also preferably refers to processor 130 being dedicated to force feedback and sensor I/O of the interface system 10, and being closely coupled to sensors and actuators of the mechanical portion 24, such as within the housing of or in a housing coupled closely to portion 24. Microprocessor 130 can be provided with software instructions to wait for commands or requests from computer host 18, parse/decode the command or request, and handle/control input and output signals according to the command or request. In addition, processor 130 preferably operates independently of host computer 18 by reading sensor signals and calculating appropriate forces from those sensor signals, time signals, and force processes selected in accordance with a host command, and output appropriate control signals to the actuators. Suitable microprocessors for use as local microprocessor 130 include the MC68HC711E9 by Motorola and the PIC16C74 by Microchip, for example. Microprocessor 130 can include one microprocessor chip, or multiple processors and/or co-processor chips. In other embodiments, microprocessor 130 can include digital signal processor (DSP) functionality.

For example, in one host-controlled embodiment that utilizes microprocessor 130, host computer 18 can provide low-level force commands over bus 120, which microprocessor 130 directly transmits to the actuators. In a different local control embodiment, host computer system 18 provides high level supervisory commands to microprocessor 130 over bus 120, and microprocessor 130 manages low level force control loops to sensors and actuators in accordance with the high level commands and independently of the host computer 18. In the local control embodiment, the microprocessor 130 can process inputted sensor signals to determine appropriate output actuator signals by following the instructions of a "force process" that may be stored in local memory and includes calculation instructions, formulas, force magnitudes, or other data. The force process can command distinct force sensations, such as vibrations, textures, jolts, or even simulated interactions between displayed objects. An "enclosure" host command can also be provided, which causes the microprocessor to define a box-like enclosure in a graphical environment, where the enclosure has sides characterized by wall and texture forces, as described in co-pending application Ser. No. 08/881,691. The host can send the local processor a spatial layout of objects in the graphical environment so that the microprocessor has a mapping of locations of graphical objects like enclosures and can determine interactions with the cursor locally. Force feedback used in graphical environments is described in greater detail in co-pending patent application Ser. Nos. 08/571,606, 08/756,745, and 08/924,462, all of which are incorporated by reference herein.

Sensor signals used by microprocessor 130 are also reported to host computer system 18, which updates a host application program and outputs force control signals as appropriate. For example, if the user moves mouse 12, the computer system 18 receives position and/or other signals indicating this movement and can move a displayed cursor in response. These embodiments are described in greater detail in co-pending applications Ser. Nos. 08/534,791 and 08/566,282. In an alternate embodiment, no local microprocessor 130 is included in interface system 10, and host computer 18 directly controls and processes all signals to and from the interface 26 and mechanical portion 24.

A local clock 132 can be coupled to the microprocessor 130 to provide timing data, similar to system clock 116 of host computer 18; the timing data might be required, for example, to compute forces output by actuators 64 (e.g., forces dependent on calculated velocities or other time dependent factors). In alternate embodiments using the USB communication interface, timing data for microprocessor 130 can be retrieved from the USB interface. Local memory 134, such as RAM and/or ROM, is preferably coupled to microprocessor 130 in interface 26 to store instructions for microprocessor 130 and store temporary and other data. Microprocessor 130 may also store calibration parameters in a local memory 134 such as an EEPROM. As described above, link or member lengths or manufacturing variations and/or variations in coil winding or magnet strength can be stored. If analog sensors are used, adjustments to compensate for sensor variations can be included, e.g. implemented as a look up table for sensor variation over the user object workspace. Memory 134 may be used to store the state of the force feedback device, including a reference position, current control mode or configuration, etc.

Sensor interface 136 may optionally be included in electronic interface 26 to convert sensor signals to signals that can be interpreted by the microprocessor 130 and/or host computer system 18. For example, sensor interface 136 can receive signals from a digital sensor such as an encoder and convert the signals into a digital binary number representing the position of a member or component of mechanical apparatus 14. An analog to digital converter (ADC) in sensor interface 136 can convert a received analog signal to a digital signal for microprocessor 130 and/or host computer 18. Such circuits, or equivalent circuits, are well known to those skilled in the art. Alternately, microprocessor 130 can perform these interface functions without the need for a separate sensor interface 136. Or, sensor signals from the sensors can be provided directly to host computer system 18, bypassing microprocessor 130 and sensor interface 136. Other types of interface circuitry 136 can also be used. For example, an electronic interface is described in U.S. Pat. No. 5,576,727, which is hereby incorporated by reference herein.

Actuator interface 138 can be optionally connected between the actuators 64 and microprocessor 130. Interface 138 converts signals from microprocessor 130 into signals appropriate to drive the actuators. Interface 138 can include power amplifiers, switches, digital to analog controllers (DACs), and other components. Such interfaces are well known to those skilled in the art. In alternate embodiments, interface 138 circuitry can be provided within microprocessor 130 or in the actuators.

In the described embodiment, power is supplied to the actuators 64 and any other components (as required) by the USB. Since the electromagnetic actuators of the described embodiment have a limited physical range and need only output, for example, about 3 ounces of force to create realistic force sensations on the user, very little power is needed. A large power supply thus need not be included in interface system 10 or as an external power adapter. For example, one way to draw additional power from the USB is to configure device 11 to appear as more than one peripheral to host computer 18; for example, each provided degree of freedom of mouse 12 can be configured as a different peripheral and receive its own allocation of power. Alternatively, power from the USB can be stored and regulated by device 11 and thus used when needed to drive actuators 64. For example, power can be stored over time and then immediately dissipated to provide a jolt force to the user object 12. A battery or a capacitor circuit, for example, can store energy and discharge or dissipate the energy when power is required by the system and/or when enough power has been stored. Alternatively, a power supply 140 can optionally be coupled to actuator interface 138 and/or actuators 64 to provide electrical power. Power supply 140 can be included within the housing of device 11, or can be provided as a separate component, for example, connected by an electrical power cord. The power storage embodiment described above, using a battery or capacitor circuit, can also be used in non-USB embodiments to allow a smaller power supply 140 to be used.

Mechanical portion 24 is coupled to electronic portion 26 and preferably includes sensors 62, actuators 64, and linkage 40. These components are described in detail above. Sensors 62 sense the position, motion, and/or other characteristics of mouse 12 along one or more degrees of freedom and provide signals to microprocessor 130 including information representative of those characteristics. Typically, a sensor 62 is provided for each degree of freedom along which mouse 12 can be moved, or, a single compound sensor can be used for multiple degrees of freedom. Example of sensors suitable for embodiments described herein are optical encoders, as described above. Linear optical encoders may similarly sense the change in position of mouse 12 along a linear degree of freedom. Alternatively, analog sensors such as potentiometers can be used. It is also possible to use non-contact sensors at different positions relative to mechanical portion 24, such as Hall effect magnetic sensors for detecting magnetic fields from objects, or an optical sensor such as a lateral effect photo diode having an emitter/detector pair. In addition, velocity sensors (e.g., tachometers) for measuring velocity of mouse 12 and/or acceleration sensors (e.g., accelerometers) for measuring acceleration of mouse 12 can be used. Furthermore, either relative or absolute sensors can be employed.

Actuators 64 transmit forces to mouse 12 in one or more directions along one or more degrees of freedom in response to signals output by microprocessor 130 and/or host computer 18, i.e., they are "computer controlled." Typically, an actuator 64 is provided for each degree of freedom along which forces are desired to be transmitted. Actuators 64 can include active actuators, such as linear current control motors, stepper motors, pneumatic/hydraulic active actuators, a torquer (motor with limited angular range), a voice coil actuator as described in the embodiments above, and/or other types of actuators that transmit a force to an object. Passive actuators can include magnetic particle brakes, friction brakes, or pneumatic/hydraulic passive actuators, and generate a damping resistance or friction in a degree of motion. For example, an electrorheological fluid can be used in a passive damper, which is a fluid that has a viscosity that can be changed by an electric field. Likewise, a magnetorheological fluid can be used in a passive damper, which is a fluid that has a viscosity that can be changed by a magnetic field. These types of dampers can be used instead of or in addition to other types of actuators in the mouse interface device. In yet other embodiments, passive damper elements can be provided on the bearings of portion 24 to remove energy from the system and intentionally increase the dynamic stability of the mechanical system. In addition, in voice coil embodiments, multiple wire coils can be provided, where some of the coils can be used to provide back EMF and damping forces. In some embodiments, all or some of sensors 62 and actuators 64 can be included together as a sensor/actuator pair transducer.

Mechanism 40 is preferably the five-member linkage 40 described above, but can also be one of several types of mechanisms. For example, mechanisms disclosed in co-pending patent applications Ser. Nos. 08/374,288 now U.S. Pat. No. 5,731,804, 08/400,233 now U.S. Pat. No. 5,767,839, 08/489,068 now U.S. Pat. No. 5,721,566, 08/560,091 now U.S. Pat. No. 5,705,140, 08/623,660 now U.S. Pat. No. 5,691,898, 08/664,086, 08/709,012, and 08/736,161 now U.S. Pat. No. 5,731,804, all incorporated by reference herein, can be included. Mouse 12 can alternatively be a puck, joystick, or other device or article coupled to linkage 40, as described above.

Other input devices 141 can optionally be included in system 10 and send input signals to microprocessor 130 and/or host computer 18. Such input devices can include buttons, such as buttons 15 on mouse 12, used to supplement the input from the user to a GUI, game, simulation, etc. Also, dials, switches, voice recognition hardware (with software implemented by host 18), or other input mechanisms can be used.

Safety or "deadman" switch 150 is preferably included in interface device to provide a mechanism to allow a user to override and deactivate actuators 64, or require a user to activate actuators 64, for safety reasons. In the preferred embodiment, the user must continually activate or close safety switch 150 during manipulation of mouse 12 to activate the actuators 64. If, at any time, the safety switch is deactivated (opened), power is cut to actuators 64 (or the actuators are otherwise deactivated) while the safety switch is open. For example, one embodiment of safety switch is a mechanical or optical switch located on mouse 12 or on a convenient surface of a housing 21. For example, when the user covers an optical safety switch with a hand or finger, the sensor of the switch is blocked from sensing ambient light, and the switch is closed. The actuators 64 thus will function as long as the user covers the switch. Other types of safety switches 150 can also be used, such as an electrostatic contact switch can be used to sense contact of the user. The safety switch can be provided between the actuator interface 138 and actuators 64 as shown in FIG. 6; or, the switch can be placed elsewhere. In some embodiments, the state of the safety switch is provided to the microprocessor 130 to provide further control over output forces. In addition, the state of the safety switch can be sent to the host 18. In yet other embodiments, a second switch can be provided to allow the user to turn off output forces of interface device 11 when desired, yet still operate the interface as an input device. The host 18 need not send force feedback commands when such a secondary switch has turned off forces.

In one embodiment, mouse 12 includes a hand weight safety switch. The safety switch preferably deactivates any generated forces on the mouse when the mouse is not in use and/or when the user desires to deactivate output forces. This is a safety feature that prevents the mouse 12 from unexpectedly moving and impacting the user when the user is not controlling the user object. Electric contact switches, a z-axis force sensor, piezo electric sensors, force sensitive resistors, or strain gauges can be used. The hand-weight safety switch can also be used to supplement a different type of safety switch.

In some embodiments of interface system 10, multiple mechanical apparatuses 102 and/or electronic interfaces 100 can be coupled to a single host computer system 18 through bus 120 (or multiple buses 120) so that multiple users can simultaneously interface with the host application program (in a multi-player game or simulation, for example). In addition, multiple players can interact in the host application program with multiple interface systems 10 using networked host computers 18, as is well known to those skilled in the art.

While this invention has been described in terms of several preferred embodiments, it is contemplated that alterations, permutations and equivalents thereof will become apparent to those skilled in the art upon a reading of the specification and study of the drawings. For example, other types of mechanical linkages can be provided between the mouse 12 and the electronic portion of the interface 14. In addition, other types of actuators, sensors, and user objects can be used in other embodiments. Furthermore, certain terminology has been used for the purposes of descriptive clarity, and not to limit the present invention. It is therefore intended that the following appended claims include all such alterations, permutations, and equivalents as fall within the true spirit and scope of the present invention.

What is claimed is:

1. A mouse interface device for interfacing a user's motion with a host computer and providing force feedback to said user, said mouse interface device comprising:

a mouse object contacted and manipulated by said user and moveable in a planar workspace with respect to a ground surface;

a planar linkage including five members rotatably coupled to each other, wherein said linkage is arranged such that a ground member is rigidly coupled to said ground surface, a first base member is rotatably coupled to said ground member to rotate about an axis of rotation, a first link member is rotatably coupled to said first base member, a second base member is rotatably coupled to said ground member at said axis of rotation such that said first base member and said second base member pivot about a single axis with respect to said ground member, and a second link member is rotatably coupled to said first link member and said second base member, wherein said mouse object is coupled to said planar linkage at said coupling of said first link member and said second link member;

a plurality of electromagnetic actuators providing forces in said planar workspace of said mouse object, said forces caused by interactions between an electric current and a magnetic field, wherein each of said actuators includes a coil portion integrated with one of said members of said linkage and a magnet portion coupled to said ground surface through which said coil portion moves, and wherein said actuators are controlled from commands output by said host computer; and a plurality of sensors coupled to said ground surface and separate from said actuators, wherein said sensors provide at least one sensor signal including information describing said movement of said mouse object from which a position of said mouse object in said planar workspace is determined.

2. A mouse interface device as recited in claim 1 wherein said first link member and said second link member are rotatably coupled to each other at ends of said link members.

3. A mouse interface device as recited in claim 1 wherein said first base member and said first link member are symmetrically arranged to said second base member and said second link member.

4. A mouse interface device as recited in claim 1 wherein said coil portion of one of said actuators is an end of said first base member, wherein a wire coil is integrated in said coil portion, and wherein said coil portion of the other one of said actuators is an end of said second base member, wherein a wire coil is integrated in said end of said second base member.

5. A mouse interface device as recited in claim 1 wherein each of said actuators is spaced apart from said other actuatours in a plane parallel to said planar workspace.

6. A mouse interface device as recited in claim 5 wherein a base portion of one of said actuators is used as a base portion of a different actuator.

7. A mouse interface device as recited in claim 3 wherein said first and second base members are coupled to a rotation point not at an end of said base members, where one end of each base member integrates said coil such that said coil is spaced from said rotation point of said member, thereby providing mechanical advantage to said forces provided by said actuator in said planar workspace.

8. A mouse interface device as recited in claim 5 wherein said sensors are digital encoders, and wherein ends of said first base member and said second base member include an encoder arc which moves past a grounded emitter and detector.

9. A mouse interface device as recited in claim 8 wherein said encoder arc includes a number of equally spaced marks, said marks being detected by said encoders when said member moves.

10. A mouse interface device as recited in claim 5 wherein said sensors each include an emitter and detector and a rotating arc, said arc including an opaque portion and a transparent strip, said transparent strip being skewed such that its distance from a center of rotation of said arc varies along the length of said strip.

11. A mouse interface device as recited in claim 1 wherein at least one of said sensors includes an emitter of a beam of electromagnetic energy and a detector that detects said beam, wherein said beam is guided to said detector by a light pipe, said sensor outputting a sensor signal indicative of said motion.

12. A mouse interface device as recited in claim 3 wherein said mouse object is rotatably coupled to said coupling between said first link member and said second link member.

13. A mouse interface device as recited in claim 2 further comprising a stop mechanism for limiting movement of said mouse object in four directions in said planar workspace to a desired area.

14. A mouse interface device as recited in claim 13 wherein said stop mechanism includes a guide opening provided in a pad surface on which said mouse object slides, wherein a portion of said linkage protrudes through said guide opening and engages sides of said guide opening to provide said limits to said movement in said planar workspace.

15. A mouse interface device as recited in claim 14 wherein said linkage is positioned beneath said pad surface, and wherein said coupling to which said mouse object is coupled extends through said guide opening.

16. A mouse interface device as recited in claim 1 wherein said mouse object is supported by a support separate from said linkage and provided between said mouse object and said ground surface, wherein said support includes a roller coupled to said mouse object.

17. A mouse interface device as recited in claim 3 further comprising an indexing input device allowing said user to change an offset between a position of said mouse object and a location of a cursor displayed on a display screen by disabling the mapping between said cursor and said mouse object.

18. A mouse interface device for providing force feedback to a user of said interface device, wherein a host computer is coupled to said mouse interface device and implements a graphical environment with which said user interacts, said interface device comprising:
  a support base provided on a grounded surface;
  a mouse object physically contacted and manipulated by said user in two degrees of freedom with respect to said grounded surface;
  a mechanical linkage including a plurality of members, wherein two of said members are rotatably coupled to said grounded surface at a single axis of rotation such that said members rotate about said single axis, said linkage coupled to said mouse object and providing said two degrees of freedom;
  a plurality of actuators, said actuators providing a force on said mouse object in said two degrees of freedom, wherein each of said actuators is spaced apart from said other actuators in a plane parallel to said planar workspace; and
  at least one sensor detecting movement of at least one of said members of said linkage, wherein said sensor includes an emitter that emits a beam of energy and a detector that detects said beam, wherein both said emitter and said detector of said sensor are coupled to said grounded surface.

19. A mouse interface device as recited in claim 18 wherein said linkage includes two base members coupled to said grounded surface at said single axis of rotation and a link member rotatably coupled to one of said base members and to said mouse object, wherein a portion of said linkage is positioned beneath a support surface that is included in said support base and provided above said grounded surface, and a different portion of said link member extends through said support surface and is coupled to said mouse object.

20. A mouse interface device as recited in claim 18 wherein said linkage includes a planar linkage including five members rotatably coupled to each other, such that a ground member is coupled to said grounded surface, a first base member is rotatably coupled to said ground member, a first link member is rotatably coupled to said first base member, a second base member is rotatably coupled to said ground member, and a second link member is rotatably coupled to said first link member and said second base member, wherein said mouse object is coupled to said planar linkage at said coupling of said first link member and said second link member, wherein said coupling extends through a support surface that is included in said support base and provided above said grounded surface.

21. A mouse interface device as recited in claim 18 wherein said support base includes a support surface provided above said grounded surface, wherein a portion of said linkage is positioned beneath said support surface and wherein a portion of said linkage extends through a guide opening in said support surface and is coupled to said mouse object.

22. A mouse interface device as recited in claim 21 wherein said guide opening functions as a stop mechanism wherein said portion of said linkage extending through said opening engages sides of said guide opening to provide limits to said movement of said mouse object, said mouse object moveable in a planar workspace.

23. A mouse interface device as recited in claim 22 wherein said mechanical linkage is provided between said support surface and said grounded surface.

24. A mouse interface device as recited in claim 20 wherein said actuators are voice coil actuators, each of said voice coil actuators including a wire coil integrated with one of said base members of said linkage, wherein said wire coil moves through a magnetic field provided by a plurality of grounded magnets surrounding said wire coil, and wherein a housing providing a flux path surrounds said magnets, each of said wire coils being coupled to an end of a different member of said planar linkage, said coils guided through said magnetic field by said planar linkage.

25. A mouse interface device as recited in claim 24 wherein said sensor detects movement of said members having said wire coils, and wherein said sensor includes an emitter that emits a beam of energy and a detector that detects said beam, wherein both said emitter and said detector of said sensor are coupled to said grounded surface.

26. A mouse interface device as recited in claim 24 wherein said base members and said coils pivot about said single axis of rotation.

27. A mouse interface device as recited in claim 21 further comprising a roller coupled to said linkage at said coupling coupled to said mouse object, said roller supporting said mouse object on said grounded surface.

28. A force feedback interface device for interfacing with a host computer system implementing a graphical environment, the force feedback interface device comprising:
  a user manipulatable object physically contacted and manipulated by a user and moved in two degrees of freedom with respect to a reference surface;
  a mechanism coupling said user manipulatable object to said reference surface and allowing movement of said user manipulatable object in said two degrees of freedom;
  at least one actuator providing a force to said user; and
  a sensor detecting movement of said user manipulatable object and outputting a sensor signal indicative of said movement, wherein said sensor includes an emitter that emits a beam of energy and a detector that detects said beam, wherein both said emitter and said detector of said sensor are coupled to said reference surface, and wherein said sensor includes an arc coupled to a rotating member of said mechanism rotatable about an axis, said arc including a portion which prevents portions of said beam from being detected by said detector, and including a strip which directs portions of said beam impinging on said strip to be detected by said detector, wherein said strip is skewed such that different portions of said strip are at different distances from said axis.

29. A force feedback interface device as recited in claim 28 wherein said emitter is positioned on one side of said arc, and said detector is positioned on a different side of said arc.

30. A force feedback interface device as recited in claim 29 wherein said portion of said arc that prevents said beam is opaque to block portions of said beam from impinging on said detector, and wherein said strip is transparent to allow said beam to impinge on said detector.

31. A force feedback interface device as recited in claim 28 wherein said mechanism includes a linkage having a plurality of members, at least one of said members being rotatable.

32. A force feedback interface device as recited in claim 31 wherein said emitter is positioned on a same side of said arc as said detector, wherein said strip is reflective to reflect said beam to said detector, and wherein said portion of said arc that prevents said beam is not reflective such that said portions of said beam impinging on said arc portion are not reflected to said detector.

33. A force feedback interface device as recited in claim 31 wherein said actuators include two grounded voice coil actuators, each of said actuators including a wire coil provided on a different member of said linkage, each of said wire coils pivoting about a single axis of rotation, wherein each of said actuators includes a plurality of grounded magnets in a flux path housing surrounding said wire coil, wherein said housing of one of said actuators is positioned above and contacting said housing of said other actuator, and wherein each of said actuators is receptive to a control signal operative to control an output force from said actuator on said member having said wire coil.

34. A force feedback interface device as recited in claim 33 wherein said sensor is a first sensor and further comprising a second sensor including an emitter, detector, and arc, each of said sensors coupled to one of said members of said linkage.

35. A force feedback interface device as recited in claim 28 wherein said at least one actuator is one of a plurality of actuators in said force feedback interface device, said actuators outputting said force in said two degrees of freedom on said user manipulatable object.

36. A force feedback interface device as recited in claim 28 wherein said detector includes a length, wherein said detector can sense a location of said beam at different positions along said length.

37. A force feedback interface device as recited in claim 36 wherein said beam is sufficiently wide to cover said strip and at least a portion of said arc portion preventing said beam, wherein only a portion of said beam that is impinging on said strip is detected by said detector.

38. A mouse interface device for interfacing a user's motion with a host computer and providing force feedback to said user, said mouse interface device comprising:
  a mouse object contacted and manipulated by said user and moveable in a planar workspace with respect to a ground surface;
  a planar linkage including five members rotatably coupled to each other, wherein said linkage is arranged such that a first base member is rotatably coupled to a ground member, a first link member is rotatably coupled to said first base member, a second base member is rotatably coupled to said ground member, and a second link member is rotatably coupled to said first link member and said second base member, wherein said mouse object is coupled to said planar linkage at said coupling of said first link member and said second link member;
  a plurality of electromagnetic actuators providing forces in said planar workspace of said mouse object, said forces caused by interactions between an electric field and a magnetic field, wherein each of said actuators includes a coil portion integrated with one of said members of said linkage and a magnet portion coupled to said ground surface through which said coil portion moves, and wherein said actuators are controlled from commands output by said host computer;
  a plurality of sensors coupled to said ground surface and separate from said actuators, wherein said sensors provide at least one sensor signal including information describing said movement of said mouse object from which a position of said mouse object in said planar workspace is determined; and
  an indexing input device allowing said user to change the offset between a position of said mouse object and a location of a cursor displayed on a display screen of said host computer by disabling a mapping between said cursor and said mouse object.

39. A mouse interface device for providing force feedback to a user of said interface device, wherein a host computer is coupled to said mouse interface device and implements a graphical environment with which said user interacts, said interface device comprising:
  a support base provided on a grounded surface, said base including a support surface provided above said grounded surface;
  a mouse object physically contacted and manipulated by said user in two degrees of freedom with respect to said support surface, wherein said mouse object contacts said support surface;
  a mechanical linkage including a plurality of members, said linkage coupled to said mouse object and providing said two degrees of freedom, wherein said linkage includes a planar linkage including five members rotatably coupled to each other, a first base member is rotatably coupled to a ground member, a first link member is rotatably coupled to said first base member, a second base member is rotatably coupled to said ground member, and a second link member is rotatably coupled to said first link member and said second base member, wherein said mouse object is coupled to said planar linkage at said coupling of said first link member and said second link member, wherein a portion of said linkage is positioned beneath said support surface and wherein said coupling of said first and second link members extends through said support surface and is coupled to said mouse object;

a plurality of actuators, said actuators providing a force on said mouse object in said two degrees of freedom, wherein each of said actuators is spaced apart from said other actuators in a plane parallel to said planar workspace; and at least one sensor detecting movement of at least one of said members of said linkage, wherein said sensor includes an emitter that emits a beam of energy and a detector that detects said beam, wherein both said emitter and said detector of said sensor are coupled to said grounded surface.

* * * * *

UNITED STATES PATENT AND TRADEMARK OFFICE
CERTIFICATE OF CORRECTION

PATENT NO. : 6,166,723
DATED : December 26, 2000
INVENTOR(S) : Bruce M. Schena and Louis B. Rosenberg It is certified that error appears in the above-identified patent and that said Letters Patent is hereby corrected as shown below:

<u>Title page,</u>
Item [63], Related U.S. Application Data, replace "Pat. No. 5,815,308" with -- Pat. No. 5,825,308 --

Signed and Sealed this

Twenty-first Day of September, 2004

JON W. DUDAS
*Director of the United States Patent and Trademark Office*